United States Patent
Irie

(10) Patent No.: US 9,058,513 B2
(45) Date of Patent: Jun. 16, 2015

(54) IMAGE VERIFICATION DEVICE, IMAGE PROCESSING SYSTEM, IMAGE VERIFICATION PROGRAM, COMPUTER READABLE RECORDING MEDIUM, AND IMAGE VERIFICATION METHOD

(75) Inventor: Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 108 days.

(21) Appl. No.: 13/985,081

(22) PCT Filed: Mar. 17, 2011

(86) PCT No.: PCT/JP2011/056466
§ 371 (c)(1),
(2), (4) Date: Sep. 24, 2013

(87) PCT Pub. No.: WO2012/124124
PCT Pub. Date: Sep. 20, 2012

(65) Prior Publication Data
US 2014/0010419 A1 Jan. 9, 2014

(30) Foreign Application Priority Data

Mar. 14, 2011 (JP) ................................ 2011-055970

(51) Int. Cl.
*G06K 9/00* (2006.01)
*G06K 9/62* (2006.01)

(52) U.S. Cl.
CPC .......... *G06K 9/00288* (2013.01); *G06K 9/6272* (2013.01); *G06K 9/6292* (2013.01)

(58) Field of Classification Search
None
See application file for complete search history.

(56) References Cited

U.S. PATENT DOCUMENTS

| | | | | |
|---|---|---|---|---|
| 7,471,833 | B2* | 12/2008 | Skarbek et al. | 382/226 |
| 8,406,525 | B2* | 3/2013 | Ma et al. | 382/191 |
| 2011/0286628 | A1* | 11/2011 | Goncalves et al. | 382/103 |

FOREIGN PATENT DOCUMENTS

| | | |
|---|---|---|
| JP | 2003-141542 A | 5/2003 |
| WO | 2006/097902 A2 | 9/2006 |

OTHER PUBLICATIONS

International Search Report issued in PCT/JP2011/056466 mailed on May 31, 2011 (2 pages).
Extended European Search Report issued in corresponding European Application No. 11861311.6, mailed on Mar. 10, 2015 (14 pages).

* cited by examiner

*Primary Examiner* — Anand Bhatnagar
*Assistant Examiner* — Soo Park
(74) *Attorney, Agent, or Firm* — Osha Liang LLP

(57) ABSTRACT

An image verification device that checks an input image obtained by photographing an object to be checked against a registered image database, wherein, in the registered image database, an amount of feature of an image obtained by photographing an object is registered as a registered image, and the registered image includes registered images registered with respect to a plurality of objects, has a verification score calculating unit that calculates a verification score serving as a score representing a degree of approximation between the objects indicated by the registered images and the object of the input image by using the amount of feature of the input image and the amounts of feature of the registered images, and a relative evaluation score calculating unit.

20 Claims, 23 Drawing Sheets

IMAGE VERIFICATION DEVICE, IMAGE PROCESSING SYSTEM, IMAGE VERIFICATION PROGRAM, COMPUTER READABLE RECORDING MEDIUM, AND IMAGE VERIFICATION METHOD

BACKGROUND

1. Technical Field

The present invention relates to an image verification device that checks an image obtained by photographing an object against an image database, an image processing system, an image verification program, a computer readable recording medium, and an image verification method.

2. Related Art

A conventional face authentication technique that registers an image obtained by preliminarily photographing a human face in a database and, depending on an input of an image obtained by photographing the face of a person to be recognized, and compares the input image with registration contents of the database to identify individuals from each other so as to make authentication is known.

An authentication process in the face authentication technique illustratively includes a registration process and an authentication process. A concrete example will be described below.

In registration, from an image obtained by photographing the face of a person, an amount of feature representing characteristics of the face of the person are extracted and registered in advance. On the other hand, in authentication, the amount of feature is extracted from an input image. The amount of feature extracted from the input image is compared with an amount of feature registered in a database to calculate an authentication score. The authentication score is evaluated to determine whether the input image is matched with an image registered in the database.

Here, in the case where persons who have a relationship such as brothers or children and parents and have similar faces are registered, an approximate authentication score tends to be calculated between the persons. For this reason, it is known that erroneous authentication easily occurs during authentication. More specifically, when an input image is simply compared with the image of a person registered in a database, erroneous authentication may occur between registered persons having similar faces.

In order to prevent the erroneous authentication, various techniques have been proposed. For example, Patent Document 1 discloses that registered data of persons having similar faces are grouped to set threshold values depending on the groups in evaluation of authentication scores.

CITATION LIST

Patent Document

Patent Document 1: Japanese Unexamined Patent Publication "Japanese Unexamined Patent Publication No. 2003-141542 (publication date: published on May 16, 2003)"

SUMMARY

However, the technique described in Patent Document 1 is difficult to set an appropriate threshold value. For example, when an approximate authentication score is calculated between persons who are brothers or the like, threshold values are difficult to be set in advance to make it possible to discriminate both the persons from each other. For this reason, threshold values tend to be forcibly experientially set by trial and error.

One or more embodiments of the present invention provides a face authentication device or the like that can improve authentication accuracy by combining evaluation made by comparison between an input image and a registered image of a database and an evaluation method except for the above evaluation method.

An image verification device according to one or more embodiments of the present invention checks an input image obtained by photographing an object to be checked against a registered image database, wherein in the registered image database, an amount of feature of an image obtained by photographing an object is registered as a registered image, the registered image including registered images registered with respect to a plurality of objects, and the image verification device includes: a verification score calculating means that calculates a verification score serving as a score representing a degree of approximation between the objects indicated by the registered images and the object of the input image by using the amount of feature of the input image and the amounts of feature of the registered images, a relative evaluation score calculating means that calculates a relative evaluation score serving as a score representing a degree of approximation between one object registered in the registered image database and the object of the input image in comparison with the other objects, an integrated score calculating means that calculates an integrated score obtained by weighting the verification score and the relative evaluation score, and an image verification means that performs verification of the input image on the basis of the integrated score.

An image verification program according to one or more embodiments of the present invention checks an input image obtained by photographing an object to be checked against a registered image database, wherein in the registered image database, an amount of feature of an image obtained by photographing an object is registered as a registered image, the registered image including registered images registered with respect to a plurality of objects, and the image verification program causes a computer to execute a process including, a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating step of calculating an integrated score obtained by weighting the verification score and the relative evaluation score, and an image verification step of performing verification of the input image on the basis of the integrated score.

An image verification method according to one or more embodiments of the present invention checks an input image obtained by photographing an object to be checked against a registered image database, wherein in the registered image database, an amount of feature of an image obtained by photographing an object is registered as a registered image, the registered image including registered images registered with respect to a plurality of objects, and the image verification method includes: a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating step of calculating an integrated score obtained by weighting the verification score and the relative evaluation score, and an image verification step of performing verification of the input image on the basis of the integrated score.

According to the above configuration, by using an integrated score obtained by considering not only a verification score between the input image and the object but also a relative evaluation score representing a degree of approximation between one object of the plurality of objects registered in the registered image database and the object of the input image in comparison with the other objects, verification of the input image can be performed.

In this case, the object means a pattern-recognizable thing typified by a person or an automobile. The object may be a part of a certain object. For example, the object is a person, and a part of the object is the face of the person.

An amount of feature of an image photographing an object means information to be compared to perform verification of an image obtained by photographing the object.

More specifically, the amount of feature may be an image itself obtained by photographing the object, i.e., a pixel value, or a value representing an apparent feature of the object that is extracted from the image.

The amount of feature may be extracted from one specific image obtained by photographing an object or may be extracted from a plurality of images obtained by photographing the object.

In the above configuration, the amounts of feature are registered in the registered image database as registered images in advance.

The verification score is a score derived by using the amount of feature of the input image and the amounts of feature of the registered images.

The verification score means a so-called degree of approximation representing a degree of approximation between the object photographed as the input image and the objects illustrated by the registered images. Thus, in other words, the verification score is an absolute evaluation score that can be uniquely calculated between the input image and a registered image when the registered image is determined as a target of which the score should be calculated.

In this case, more specifically, the verification score is a degree of approximation obtained by comparing the amount of feature of the object photographed as the input image and amounts of feature of the registered images.

More specifically, the verification score can also represent a degree of approximation between the registered images and the input image with a central focus of the input image. For example, when the objects are persons, the verification scores tend to be close to each other between persons such as brothers having similar appearances.

In contrast to this, a relative evaluation score is a relative score derived from the registered image of a certain object and the registered images of the other objects. For example, the relative evaluation score is a relative score between the registered images of a plurality of objects derived by comparing verification scores between the registered image of a certain object and the input image with a verification score between the registered images of the other objects and the input image.

More specifically, a degree of similarity between the registered image of the certain object and the input image in comparison with the registered images of the other objects on the basis of the relative evaluation scores.

Furthermore, an integrated score obtained by integrating the verification score with the relative evaluation score is calculated. The integrated score, for example, can be calculated by a predetermined arithmetic method. The integrated score, more specifically, can be obtained by arbitrarily weighting the verification score and the relative evaluation score.

For example, the integrated score may be an average of the verification score and the relative evaluation score. In this case, both the scores may be uniformly weighted.

In addition, for example, the integrated score may be a weighting average of the verification score and the relative evaluation score.

As described above, the integrated score is obtained by combining the verification score serving as an index representing a degree of approximation between the input image and the registered image and a relative evaluation score serving as an index representing a degree of approximation between the registered image of one object in the registered images of a plurality of objects and the input image in comparison with the registered images of the other objects.

Since authentication is performed by using the integrated score as described above, an identification rate for similar objects that may be erroneously determined when verification is performed with only a verification score can be improved.

The image verification method may be achieved by a computer. In this case, when a computer is caused to execute a process including the steps described above, an image verification program that causes a computer to achieve the steps of the image verification method and a computer readable recording medium on which the image verification program is recorded are also included in the scope of the present invention.

An image verification device according to one or more embodiments of the present invention in which an amount of feature of an image obtained by photographing an object is registered as a registered image in a registered image database, and the registered image includes registered images registered with respect to a plurality of objects, the image verification device includes: a verification score calculating means that calculates a verification score serving as a score representing a degree of approximation between the objects indicated by the registered images and the object of the input image by using the amount of feature of the input image and the amounts of feature of the registered images, a relative evaluation score calculating means that calculates a relative evaluation score serving as a score representing a degree of approximation between one object registered in the registered image database and the object of the input image in comparison with the other objects, an integrated score calculating means that calculates an integrated score obtained by weighting the verification score and the relative evaluation score, and an image verification means that performs verification of the input image on the basis of the integrated score.

An image verification program according to one or more embodiments of the present invention in which an amount of feature of an image obtained by photographing an object is registered as a registered image in the registered image database, and the registered image includes registered images registered with respect to a plurality of objects causes a computer to execute a process including a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating unit of calculating an integrated score obtained by weighting the verification score and the relative evaluation score, and an image verification step of performing verification of the input image on the basis of the integrated score.

An image verification method according to one or more embodiments of the present invention in which an amount of feature of an image obtained by photographing an object is registered as a registered image in the registered image database, and the registered image includes registered images registered with respect to a plurality of objects includes a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating unit of calculating an integrated score obtained by weighting the verification score and the relative evaluation score, and an image verification step of performing verification of the input image on the basis of the integrated score.

Since authentication is performed by using the integrated score as described above, an identification rate for similar objects that may be erroneously determined when verification is performed with only a verification score can be improved.

Other characteristic features of one or more embodiments of the present invention will be sufficiently understood by the following description. Advantages of one or more embodiments of the present invention will be apparent by the following explanation with reference to the accompanying drawings.

DETAILED DESCRIPTION

Embodiment 1

Figure 1:
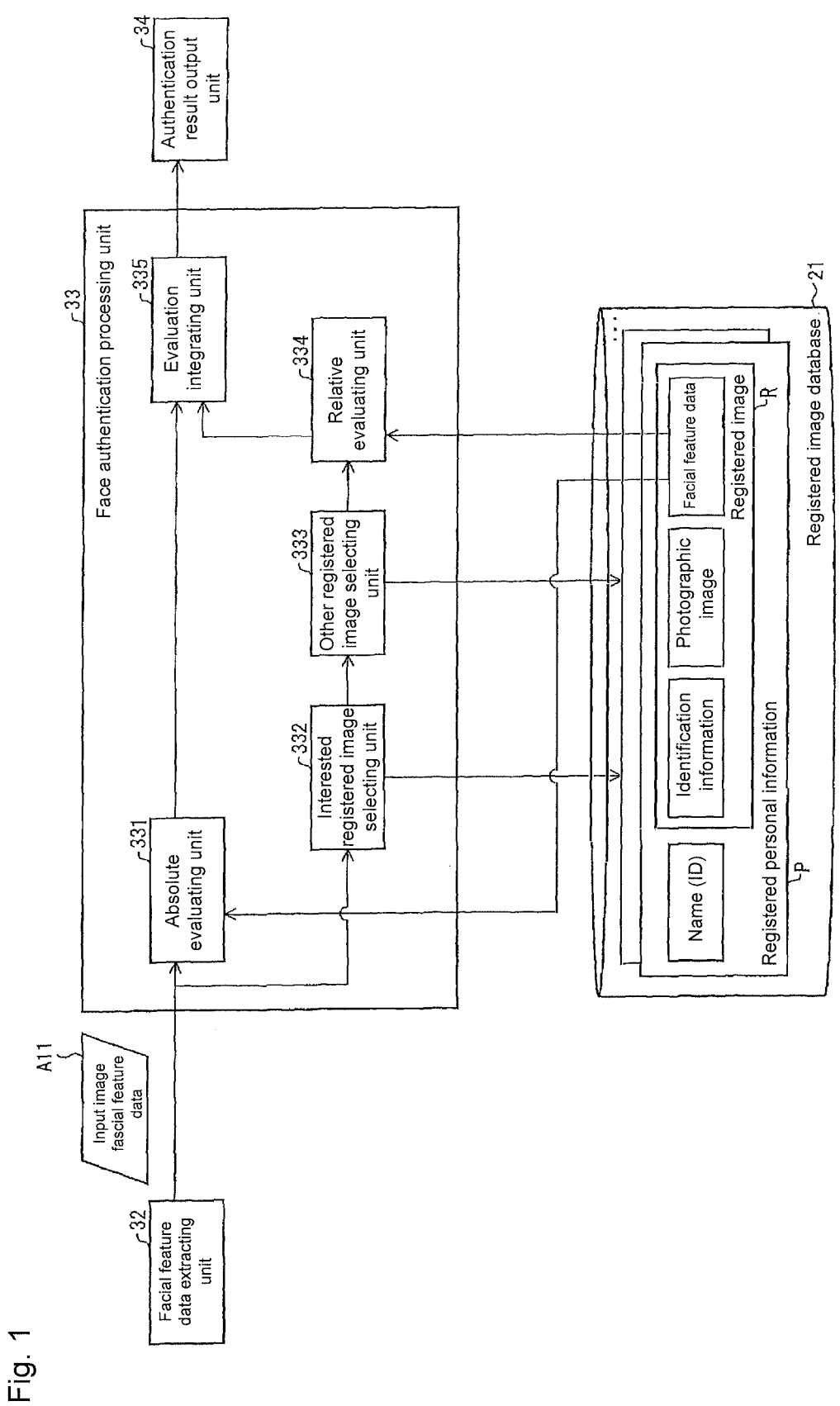
FIG. 1 is a functional block diagram illustrating an example of a schematic configuration of a face authentication processing unit included in a face authentication device according to an embodiment of the present invention.
Figure 2:
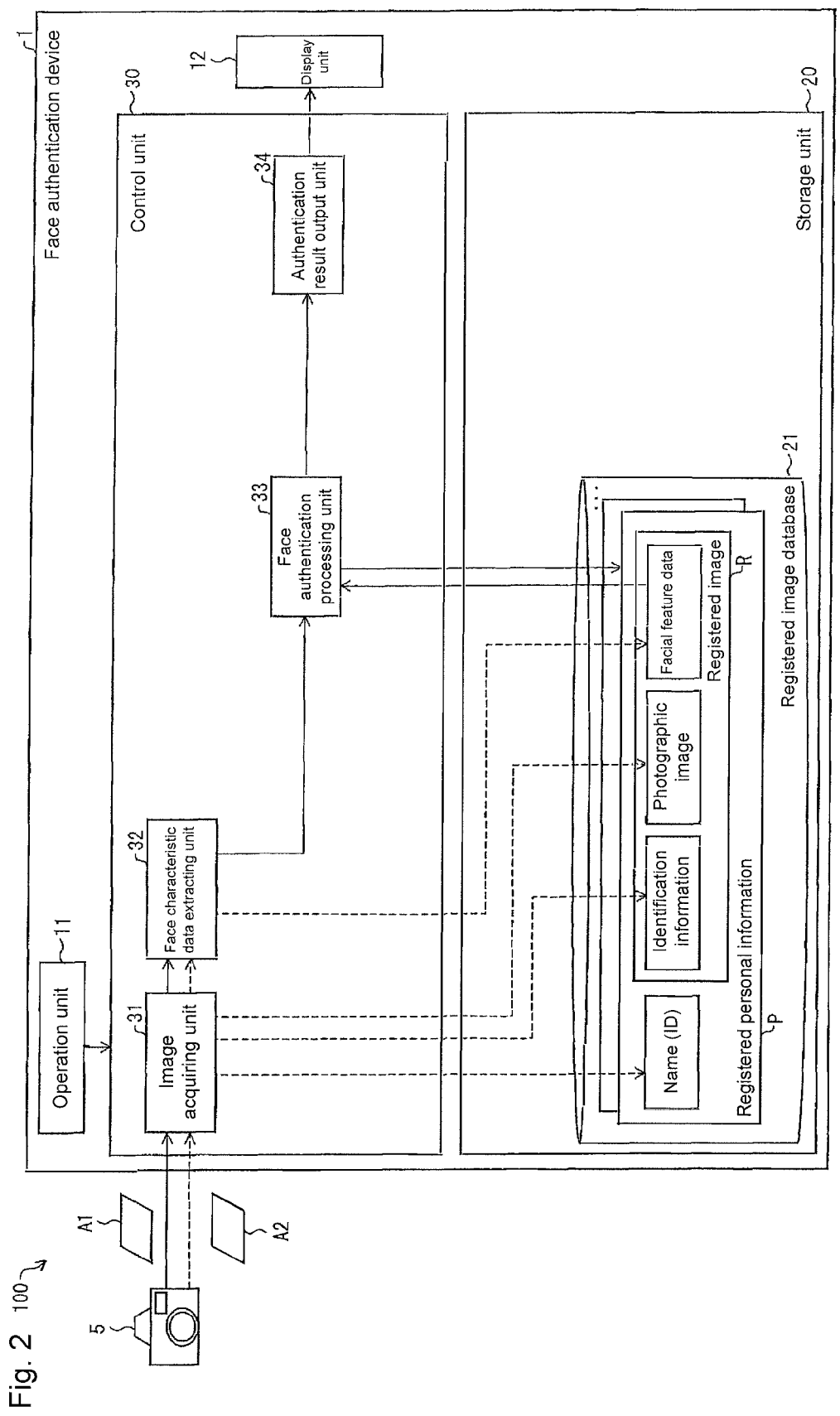
FIG. 2 is a block diagram illustrating a configuration of a face authentication system including a face authentication device according to an embodiment of the present invention.

An embodiment of the present invention will be described with reference to FIG. 1 to FIG. 15. A face authentication system will be described below with reference to FIG. 2. As illustrated in FIG. 2, a face authentication system (image processing system) 100 includes a face authentication device (image verification device) 1 and an image input device 5.

The face authentication device 1 is a device that authenticates an image inputted from the image input device 5. An authentication process in the face authentication device 1 includes two steps including a "face image registering process" and a "face image authentication process". In the "face image registering process" of the first step, an image used for authentication is registered in the face authentication device 1 in advance. In the "face image authentication process" of the second step, an input image is checked against the registered image to perform authentication.

The following description assumes that a term "authentication" illustratively means a process in which it is verified whether the face of a person photographed as an input image is matched with the face of a person photographed as any one of the registered images so as to specify the person.

The image input device 5 is a device that inputs a photographed image obtained by photographing the face of a person to the face authentication device 1. The image input device 5, for example, can be produced by a digital camera or the like that photographs the face of a person serving as a photographic subject to generate an image.

In the following description, although the face of a person is photographed as a photographed image, a photographic subject is not limited to the face of a person. More specifically, a target photographic subject can be arbitrarily selected. In the following description, as needed, in the "face image registering process", hereinafter, a photographic image inputted to the face authentication device 1 to register the photographic image is called a "registration target image A2". In the "face image authentication process", a photographic image input to the face authentication device 1 for a target of authentication is called an "input image A1" hereinafter. When the "input image A1" and the "registration target image A2" need not be specially discriminated from each other, the images are simply called "photographic images".

In the face authentication system 100, the face authentication device 1 and the image input device 5 may be arranged in the same housing or may be configured as different housings, respectively. A connection system between the face authentication device 1 and the image input device 5 is not specially limited. For example, a cable system or a wireless system may be used.

(Face Authentication Device)

Various configurations of the face authentication device 1 will be described below with reference to FIG. 2. As illustrated in FIG. 2, the face authentication device 1 includes an operation unit 11, a display unit 12, a storage unit 20, and a control unit 30.

The operation unit 11 is to accept various inputs from a user, and, for example, can be realized by a pointing device such as an input button, a keyboard, a ten-key pad, and a mouse, a touch panel, or another input device. The operation unit 11 generates operation data depending on accepted operations of a user and transmits the generated operation data to the control unit 30.

The display unit 12 is to perform screen display to provide information to a user. The display unit 12 displays various pieces of information such as characters or images on a display screen on the basis of screen data received from the control unit 30. The display unit 12, for example, can be realized by a display device such as an LCD (Liquid Crystal Display), a PDP (Plasma Display Panel), and an EL (Electroluminescence) display.

The storage unit 20 is to store various pieces of data and programs. The storage unit 20 can be realized by combining, for example, storage devices such as a ROM (Read Only Memory), a RAM (Random Access Memory), and a nonvolatile memory (for example, a flash memory) to each other. Details of various pieces of data stored in the storage unit 20 will be described later.

The control unit 30 is to totally control various functions in the face authentication device 1. A control function of the control unit 30 is realized by causing a processing device such as a CPU (Central Processing Unit) to execute a control program. For example, the control unit 30 includes a function of executing an authentication process. A configuration to cause the control unit 30 to execute an authentication process will be described later.

(About Details of Storage Unit)

Details of the storage unit 20 will be described below with reference to FIG. 2 and FIG. 3. As illustrated in FIG. 2, the storage unit 20 includes a registered image database 21.

The registered image database 21 is to register images used for authentication in units of persons in advance. Registered contents of the registered image database 21 will be more concretely illustrated below.

As illustrated in FIG. 2, a plurality of pieces of registered personal information P are registered in the registered image database 21.

In this case, details of the registered personal information P will be described below with reference to FIG. 3. FIG. 2 is a diagram illustrating a data structure of registered personal information according to an embodiment of the present invention.

Figure 3:
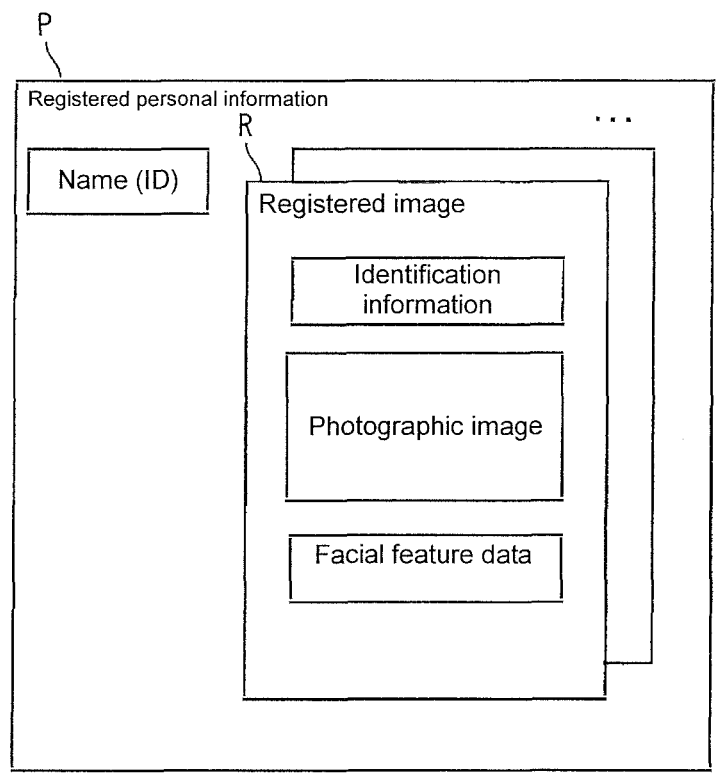
FIG. 3 is a diagram illustrating a data structure of registered personal information according to an embodiment of the present invention.

As exemplified in FIG. 3, the name (ID) of a registered person is added to the registered personal information P to make it possible to identify the person. One registered image R or a plurality of registered images R are registered in the registered personal information P. An explanation will be illustratively made on the assumption that the plurality of registered images R are registered.

The registered image R includes an image used for authentication and relative information thereof, and, more specifically, is a data structure including identification information, a photographic image, and facial feature data.

As the identification information, information to identify the registered image R is stored. As the identification information, arbitrary identification information can be used. For example, as the identification information, a file name of the registered image R can be employed.

As the photographic image, the registration target image A2 inputted in the "face image registering process" is stored. As the photographic image, the registration target image A2 itself may be registered, or a thumbnail or the like of the registration target image A2 may be stored. As the photographic image, an image obtained by processing the registration target image A2, e.g., an image subjected to image processing such as filter processing may be stored.

The photographic image can be omitted from the data structure of the registered personal information P. More specifically, the registered image R only need to include information that can derive "facial feature data" (will be described below) and identification information. When the facial feature data and the identification data are used, face authentication of an input image can be performed. In this manner, the person of the input image can be specified.

As the facial feature data, an amount of feature representing characteristics of the face of a person included in the photographic image is stored. The amount of feature is obtained by quantifying an entire face or a part recognized as an eye, a nose, or a mouth in the face of a person included in a photographic image. As an example of the amount of feature, bright information, frequency characteristic information, and information obtained by digitizing the shapes, positions, sizes, and the like of the parts are given.

The registered image R may have a data structure including, as items, pieces of various information representing results obtained by analyzing a state of the face of a person, an environment, and a photographic condition when the photographic image is taken.

For example, the registered image R may include a "direction of face", an "expression of face", a "degree of smile", an "illumination condition", a "degree of glow", and the like. As other items, an "age", a "sex", an "eye-opening manner", and the like can be employed.

(About Details of Control Unit)

Details of the control unit 30 will be described below with reference to FIG. 2. As illustrated in FIG. 2, the control unit 30 includes an image acquiring unit 31, a facial feature data extracting unit 32, a face authentication processing unit 33, and an authentication result output unit (image verification means) 34.

The units included in the control unit 30 realizes a "face image registering process" and a "face image authentication process" included in the authentication process in the face authentication device 1.

The "face image registering process" is realized by an image acquiring unit 31 and a facial feature data extracting unit 32.

The "face image authentication process" is produced by the image acquiring unit 31, the facial feature data extracting unit 32, the face authentication processing unit 33, and an authentication result output unit 34.

In FIG. 2, a dashed arrow connecting the parts to each other indicates a flow of data, control, and the like in the "face image registering process", and a solid arrow connecting the parts to each other indicates a flow of data, control, and the like in the "face image authentication process".

The parts included in the control unit 30 will be individually described below.

The image acquiring unit 31 is to acquire the registration target image A2 from the image input device 5 in response to an input operation in the operation unit 11. The image acquiring unit 31 transfers the acquired registration target image A2 to the facial feature data extracting unit 32.

The image acquiring unit 31, in the "face image registering process", acquires a name (ID) inputted in the operation unit 11, registers the registration target image A2 in the registered image database 21 as the registered image R of the registered personal information P related to the acquired name (ID), and transfers the registration target image A2 to the facial feature data extracting unit 32.

The image acquiring unit 31 allocates identification information to the registered image R serving as a registration target to register the registered image R in the registered image database 21. The image acquiring unit 31 may automatically generate the identification information to allocate the identification information to the registered image R, or may acquire identification information input in the operation unit 11 to allocate the identification information to the registered image R.

When a person photographed as the registration target image A2 has been registered in the registered image database 21, an authentication process may be designed to be performed on the basis of the registered image registered in the registered image database 21 so as to automatically specify a registered person.

The image acquiring unit 31, in the "face image authentication process", transfers the input image A1 to the facial feature data extracting unit 32.

The facial feature data extracting unit 32 analyzes the face of a person included in the photographic image to extract facial feature data serving as amounts of feature of parts of the face. The facial feature data extracting unit 32, in the face image registering process, stores the facial feature data extracted from the registration target image A2 as facial feature data of the registered image R serving as a registration target.

The facial feature data extracting unit 32, in the "face image authentication process", transfers the facial feature data of the input image A1 to the face authentication processing unit 33.

The face authentication processing unit 33 performs matching between an input image and a registered image and evaluation between the registered images to calculate an integrated score representing the degree of approximation between both the images. Details of the face authentication processing unit 33 will be described later.

The authentication result output unit 34 authenticates the input image A1 on the basis of the integrated score calculated by the face authentication processing unit 33 to output the authentication result to the display unit 12. The authentication result output unit 34, as the authentication result, may output the name of a specified person or may output a typical photographic image together with the name.

(Face Authentication Processing Unit)

Details of the face authentication processing unit 33 will be described below with reference to FIG. 1. FIG. 1 is a functional block diagram indicating an example of a schematic configuration of the face authentication processing unit 33.

As illustrated in FIG. 1, the face authentication processing unit 33 includes an absolute evaluating unit (verification score calculating means) 331, an interested registered image selecting unit (relative evaluation score calculating means) 332, an other registered image selecting unit (relative evaluation score calculating means) 333, a relative evaluation unit (relative evaluation score calculating means) 334, and an evaluation integrating unit (integrated score calculating means) 335.

The absolute evaluating unit 331 performs matching between an input image and a registered image to calculate a verification score representing a degree of approximation between the input image and the registered image. In the following description, a verification score calculated by the absolute evaluating unit 331 is called an "absolute evaluation score". In the calculation of the verification score, an arbitrary method can be employed.

As the method of calculating a verification score, for example, methods such as (1) Linear/nonlinear projection methods, (2) Neural network, (3) Gabor filters and wavelets, (4) Boosting, and the like are given.

As (1) linear/nonlinear projection methods, more specifically, PCA (Principal Component Analysis), LDA (Linear Discrimination Analysis), PCA using the kernel method (KPCA), LDA using the kernel method (KLDA), and the like are given. The PCA (Principal Component Analysis) includes a method using an inherent face or a subspace method. A method obtained by combining the PCA and the LDA can also be employed.

As (3) Gabor filters and wavelets, EBGM (Elastic bunch graph matching method), HMM (Hidden Markov Model), and the like are known.

As (4) Boosting, AdaBoost, LogitBoost, multi-class Boosting, and the like are known.

In addition, as the method of calculating a verification score, a method such as a K-NN method (k-nearest neighbor) can also be employed.

The absolute evaluating unit 331, more specifically, performs matching between facial feature data A11 of an input image supplied from the facial feature data extracting unit 32 and facial feature data included in the registered image R of the registered personal information P to calculate an absolute evaluation score. The absolute evaluating unit 331 supplies the calculated absolute evaluation score to the evaluation integrating unit 335.

The interested registered image selecting unit 332 selects an interested registered image that is a registered image used as a reference of evaluation of the score by the relative evaluation unit 334 from the registered images registered in the registered image database 21.

The other registered image selecting unit 333 selects, as a comparison target of the interested registered image, a selective registered image serving as a registered image of a registered person different from the registered person of the interested registered image from the registered images registered in the registered image database 21.

The relative evaluation unit 334 compares the interested registered image with the selective registered image to evaluate a relative relationship between the integrated registered image and the selective registered image.

The relative evaluation unit 334 calculates a relative evaluation score representing a degree of similarity between the interested registered image and the input image in comparison with the selective registered images. The relative evaluation score, for example, can be obtained such that distance calculation and similarity calculation for the interested registered image and the selective registered image are performed to calculate a ratio of the calculated distance to the calculated similarity. The relative evaluation score, for example, can be obtained by calculating a distance from an identification space configured between the interested registered image and the selective registered image. Details of the above description will be described later.

The relative evaluation unit 334 supplies the calculated absolute evaluation score to the evaluation integrating unit 335.

The evaluation integrating unit 335 calculates an integrated score obtained by integrating the absolute evaluation score calculated by the absolute evaluating unit 331 and the relative evaluation score calculated by the relative evaluation unit 334.

The evaluation integrating unit 335, for example, calculates the integrated score by calculating a weighting average between the absolute evaluation score and the relative evaluation score.

The evaluation integrating unit 335 may select any one of the absolute evaluation score and the relative evaluation score in the calculation of the integrated score. More specifically, the evaluation integrating unit 335 may set weighting of any one of the absolute evaluation score and the relative evaluation score as "0" in the calculation of the weighting average.

The evaluation integrating unit 335 may calculate an average between the absolute evaluation score and the relative evaluation score in the calculation of the integrated score. In this case, since deviations of data when the data fluctuates can be averaged, authentication accuracy can be improved.

(About Absolute Evaluation Score)

Figure 4:
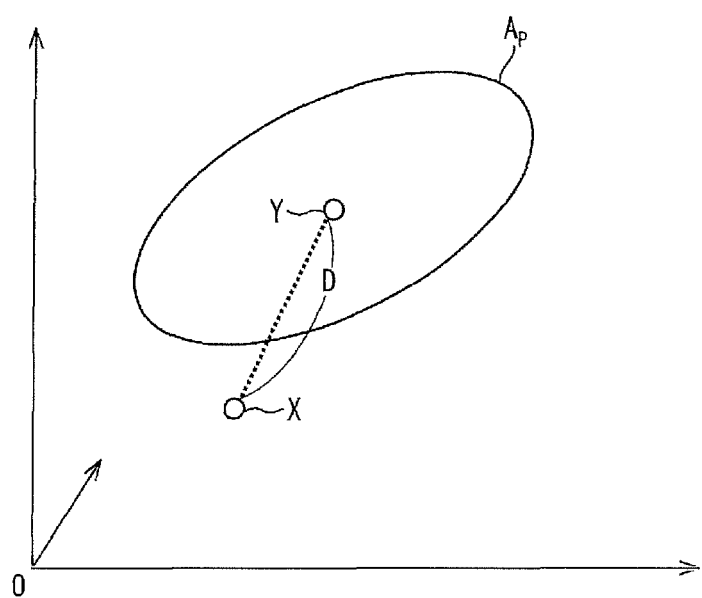
FIG. 4 is a diagram illustrating an example of calculating an absolute evaluation score by distance calculation in a characteristic space.
Figure 5:
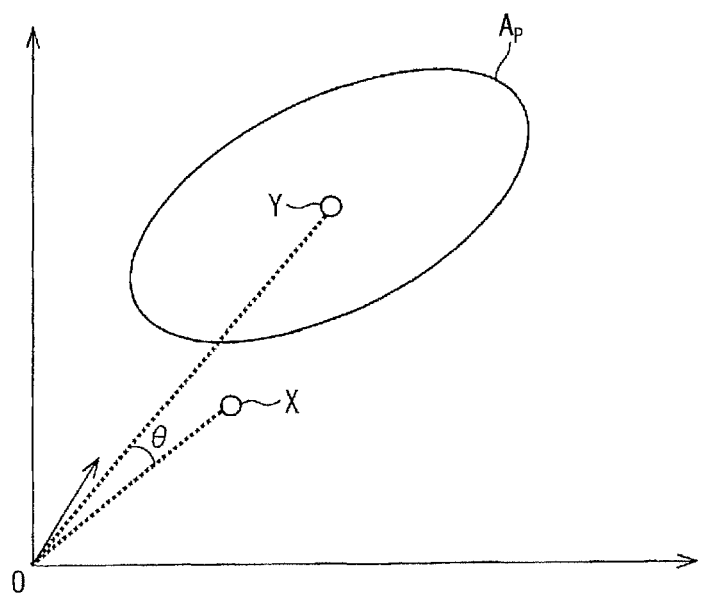
FIG. 5 is a diagram illustrating an example of calculating an absolute evaluation score by calculation of a degree of approximation in a characteristic space.

A concrete method of calculating an absolute evaluation score in the absolute evaluating unit 331 will be described below with reference to FIG. 4 and FIG. 5. FIG. 4 and FIG. 5 illustrate a characteristic space defined by a set of amounts of feature included in facial feature data.

A characteristic space $A_P$ illustrated in FIG. 4 and FIG. 5 is a space defined by an amount of feature Y of the registered personal information P.

More specifically, in an example to be described below, facial feature data included in each of the registered images R of the registered personal information P corresponds to the amount of feature Y. A reference symbol X illustrated in FIG. 4 and FIG. 5 denotes an amount of feature (to be referred to as an amount of verification characteristic X hereinafter) serving as a verification target.

At this time, the absolute evaluation score, for example, can be calculated by distance calculation or similarity calculation (will be described below).

An example of the distance calculation will be described below with reference to FIG. 4. In the distance calculation illustrated in FIG. 4, a distance D between the amount X of verification characteristic and the amount Y of characteristic in the characteristic space $A_P$ is calculated by distance calculation such as Euclidean distance technique or Mahalanobis' distance technique, and the distance D is defined as the absolute evaluation score.

Subsequently, an example of the similarity calculation will be described below with reference to FIG. 5. In the similarity calculation illustrated in FIG. 5, a normalized correlation is calculated. More specifically, on the basis of an angle θ of Y—O—X, a similarity D'=cos θ is calculated, and the calculated similarity D' is defined as an absolute evaluation score.

A degree of approximation between an input image and a registered image is regulated by the absolute evaluation score calculated as described above. More specifically, a degree of approximation between a certain registered image and another registered image can be determined by comparing the absolute evaluation scores in size.

As described above, although several candidates are given as a method of calculating an absolute evaluation score, in the following description, the similarity will be mainly explained as a degree of approximation, i.e., the definition of a degree of approximation.

(About Relative Evaluation Score)

A concrete method of calculating a relative evaluation score in the relative evaluation unit 334 will be described below.

A degree of similarity between an interested registered image and an input image in comparison with the respective selective registered images is regulated by a relative evaluation score calculated by the following methods 1 to 3. Like the absolute evaluation score, the degree of approximation can be determined by comparing relative evaluation scores in size.

[Method 1]

Figure 6:
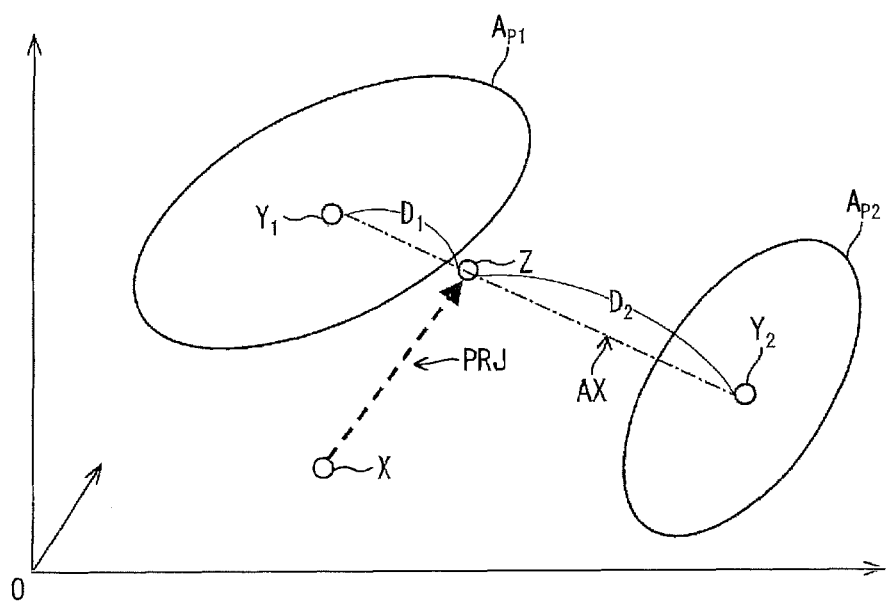
FIG. 6 is a diagram illustrating an example of calculating a relative evaluation score by distance calculation in a characteristic space.
Figure 7:
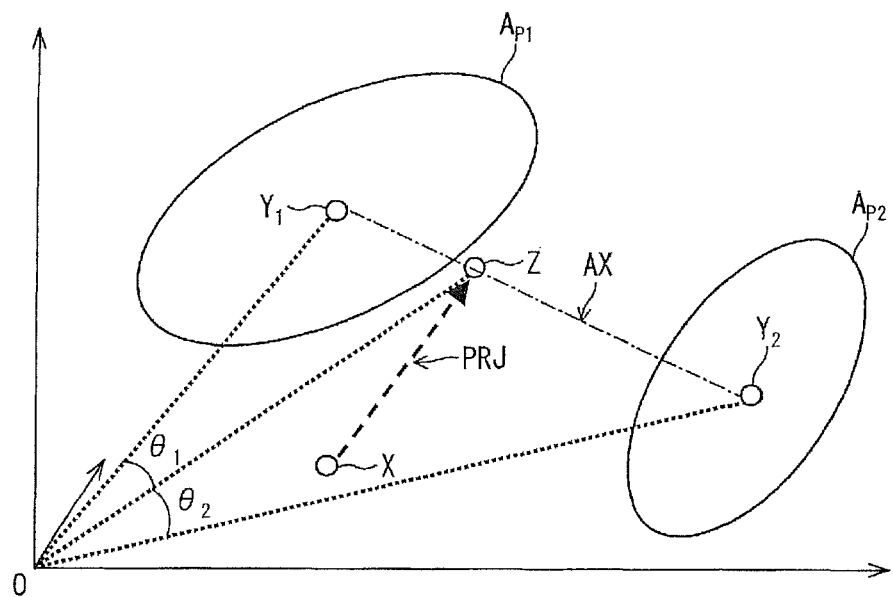
FIG. 7 is a diagram illustrating an example of calculating a relative evaluation score by calculation of a degree of approximation in a characteristic space.

An example of a concrete method of calculating a relative evaluation score in the relative evaluation unit 334 will be described below with reference to FIG. 6 and FIG. 7. FIG. 6 and FIG. 7 illustrate a characteristic space defined by a set of amounts of feature included in facial feature data.

A characteristic space $A_{P1}$ illustrated in FIG. 6 and FIG. 7 is a space defined by an amount $Y_1$ of characteristic of registered personal information P1, and a characteristic space $A_{P2}$ is a space defined by an amount $Y_2$ of characteristic of registered personal information P2.

The amount X of verification characteristic illustrated in FIG. 6 and FIG. 7 is the same as that illustrated by using FIG. 4 and FIG. 5, a description thereof will be omitted.

The relative evaluation score can be calculated by distance calculation or similarity calculation. In the distance calculation, as in case of the calculation of the absolute evaluation score, an Euclidean distance, a Mahalanobis' distance, or the like is calculated. In the similarity calculation, as in case of the absolute evaluation score, a normalized correlation is calculated.

In this manner, the calculation of the relative evaluation score is the same as that of the absolute evaluation score in that the distance calculation or the similarity calculation is performed.

In Method 1 (will be described later), a manner of calculating a distance in the distance calculation and a manner of calculating an angle in the similarity calculation are different from those of the absolute evaluation score described above.

An example of the distance calculation will be described below with reference to FIG. 6. In the distance calculation illustrated in FIG. 6, a projection space AX in which the amounts of feature of certain registered personal information P1 and other registered personal information P2 are easily discriminated from each other is calculated.

For example, the projection space AX, in the characteristic space, is a space that is calculated to make it possible to discriminate a person (Ms. or Mr. A) of an interested registered image from a person (Ms. or Mr. B) of a selective registered image. In FIG. 6 and FIG. 7, for illustration, the projection space AX is expressed as a straight line connecting the amount $Y_1$ of characteristic and the amount $Y_2$ of characteristic. However, actually, the projection space AX is an arbitrary-dimension space.

A one-dimensional projection space is a straight line, and a two-dimensional projection space is a plane. More specifically, the one-dimensional projection space is a projection straight line, and the two-dimensional projection space is a projection plane.

More specifically, the projection space AX, for example, may be a straight line connecting the amount $Y_1$ of characteristic of the characteristic space $A_{P1}$ and the amount $Y_2$ of characteristic of the characteristic space $A_{P2}$ to each other. The projection space AX may be calculated by linear or nonlinear discrimination analysis.

A projection point Z at which an amount X of verification target characteristic is projected to the projection space AX is calculated. In FIG. 6 and FIG. 7, a dotted arrow PRJ indicates projection of the amount X of verification target characteristic to the projection space AX. Furthermore, as illustrated in FIG. 6, a distance $D_1$ between the amount $Y_1$ of characteristic and the projection point Z and a distance $D_2$ between the amount $Y_2$ of characteristic and the projection point Z are calculated.

In this case, the value of the distance $D_1$ itself may be used as a relative evaluation score for the registered personal information P1, i.e., the amount $Y_1$ of characteristic.

By not only the above method, but also the following method, the relative evaluation score, for example, may be calculated from the calculated distances $D_1$ and $D_2$. More specifically, a ratio $D_1/D_2$ or $D_1/(D_1+D_2)$ may be calculated and defined as a relative evaluation score. A logarithm and an exponent of the ratio calculated as described above may be defined as a relative evaluation score.

As the relative evaluation score, as for the other registered personal information, relative evaluation scores may be calculated by the above method, the calculated relative evaluation scores may be finally summed up, and an average of the summed relative evaluation scores may be used.

Subsequently, an example of the similarity calculation will be described below with reference to FIG. 7. The similarity calculation illustrated in FIG. 7, a relative evaluation score is calculated by the following procedure.

The similarity calculation is the same as that illustrated in FIG. 6 in that the projection point Z at which the amount X of verification target characteristic is projected to the projection space AX is calculated.

In the similarity calculation, an angle $\theta_1$ of $Y_1$—O—Z and an angle $\theta_2$ of $Y_2$—O—Z are calculated. A similarity $D'_1 = \cos\theta_1$ and a similarity $D'_2 = \cos\theta_2$ are calculated.

In this case, as in the distance calculation, the value of a distance $D_1'$ itself may be used as a relative evaluation score for the registered personal information P1, i.e., the amount $Y_1$ of characteristic. In addition, as in the distance calculation, a ratio of similarities $D'_1$ and $D'_2$, a logarithm thereof, and the like may be used as the relative evaluation score. As in the distance calculation, an average of relative evaluation scores calculated by the summing-up may be used.

[Method 2]

Another example of a concrete method of calculating a relative evaluation score in the relative evaluation unit 334 will be further described below with reference to FIG. 8 and FIG. 9. In Method 2, the calculation of the absolute evaluation score illustrated in FIG. 4 and FIG. 5 is performed for two characteristic spaces to calculate a relative evaluation score between the two characteristic spaces. For example, the calculation may be performed by the distance calculation or the similarity calculation as described below.

An example of the distance calculation will be described below with reference to FIG. 8. The distances $D_1$ and $D_2$ illustrated in FIG. 8 can be calculated by applying the distance calculation illustrated in FIG. 4 to the amounts $Y_1$ and $Y_2$, of characteristic, respectively.

Figure 8:
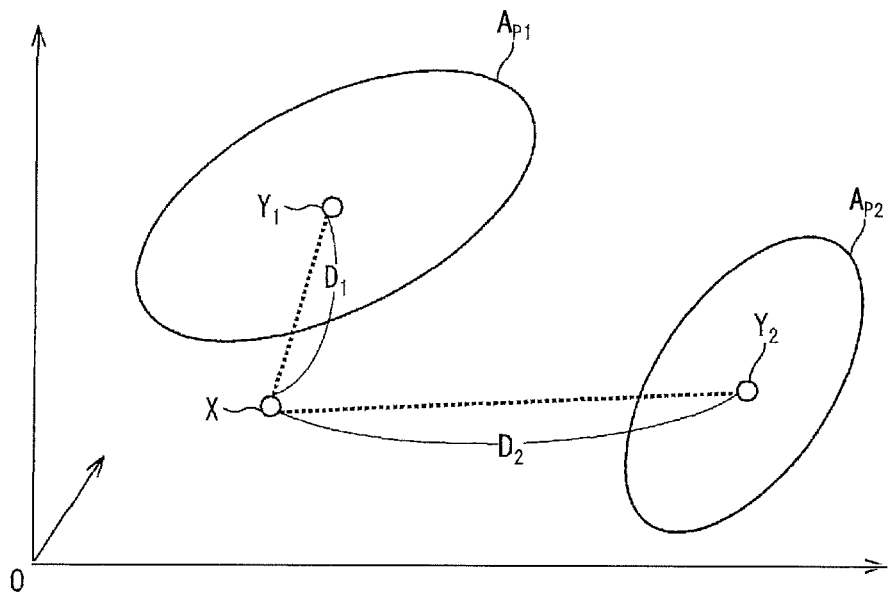
FIG. 8 is a diagram illustrating an example of calculating a relative evaluation score by distance calculation in a characteristic space.

In the distance calculation illustrated in FIG. 8, on the basis of the distances $D_1$ and $D_2$, the ratio $D_1/D_2$ or $D_1/(D_1+D_2)$ is calculated and used as the relative evaluation score. Not only the above calculation, but also the following are given as a modification of the calculation of the relative evaluation score. A logarithm and an exponent of the ratio calculated as described above may be defined as a relative evaluation score. As the relative evaluation score, as for the other registered personal information, relative evaluation scores may be calculated by the above method, the calculated relative evaluation scores may be finally summed up, and an average of the summed relative evaluation scores may be used.

Subsequently, an example of the similarity calculation will be described below with reference to FIG. 9. The distances $D_1'$ and $D_2'$ illustrated in FIG. 9 can be calculated by applying the similarity calculation illustrated in FIG. 5 to the amounts $Y_1$ and $Y_2$ of characteristic, respectively.

Figure 9:
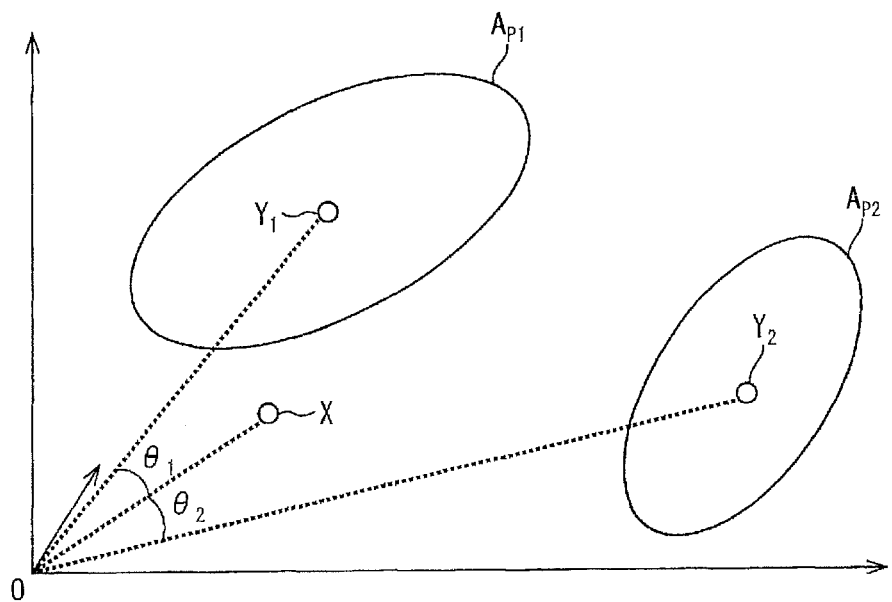
FIG. 9 is a diagram illustrating another example of calculating a relative evaluation score by calculation of a degree of approximation in a characteristic space.

More specifically, in the similarity calculation illustrated in FIG. 9, an angle $\theta_1$ of $Y_1$—O—X and an angle $\theta_2$ of $Y_2$—O—X are calculated. A similarity $D'_1 = \cos\theta_1$ and a similarity $D'_2 = \cos\theta_2$ are calculated. Furthermore, on the basis of the similarities $D'_1$ and $D'_2$ described above, the ratio described in Method 1 is calculated and used as the relative evaluation score.

Not only the ratio, but also a logarithm or the like of the calculated ratio may be used as the relative evaluation score as described in Method 1.

[Method 3]

Another example of a concrete method of calculating a relative evaluation score in the relative evaluation unit 334 will be described below with reference to FIG. 10.

As described above, the relative evaluation score is a score representing a proximity of an interested registered image to an input image in comparison with a selective registered image.

Figure 10:
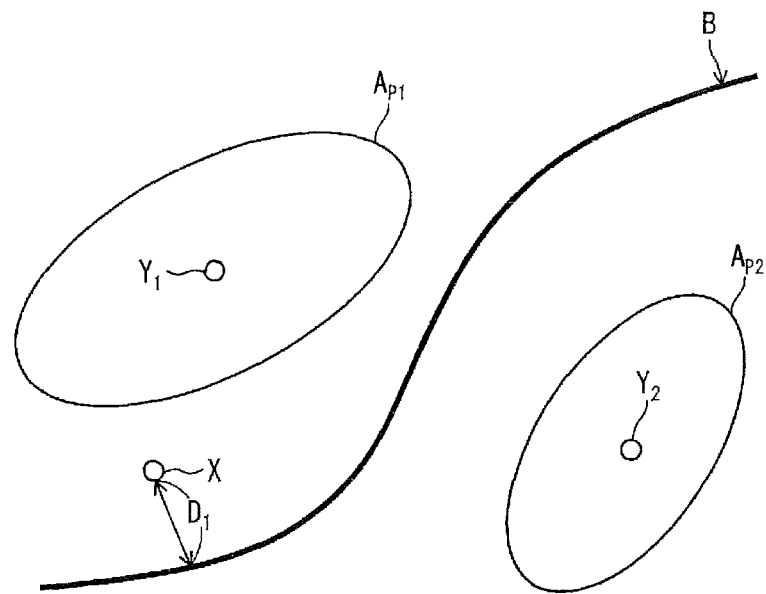
FIG. 10 is a diagram illustrating an example of calculating a relative evaluation score by clustering analysis in a characteristic space.

Thus, as illustrated in FIG. 10, the selective registered image and the interested registered image are cluster-analyzed to determine a proximity of the input image to specific one of the clusters so as to also make it possible to calculate a relative evaluation score. FIG. 10 shows an example in which an identification boundary B that divides the characteristic space $A_{P1}$ and the characteristic space $A_{P2}$ is calculated by cluster analysis. The example will be concretely described below.

For example, by using a method such as a K-means method, Boosting, or an SVM (Support Vector Machine), clustering of an amount of feature is performed to calculate an identification space identified by the identification boundary B. The identification boundary is an arbitrary-dimension space. A one-dimensional identification boundary is a straight line, and a two-dimensional identification boundary is a plane. The identification boundary may be nonlinear.

On the basis of the identification space, a similarity between input data (amount X of characteristic) and the amount $Y_1$ of characteristic is calculated. The similarity, for example, can be obtained by calculating the distance $D_1$ from the identification boundary B of the amount X of feature.

Similarly, an identification space is also formed for the amount $Y_2$ of characteristic or another amount $Y_j$ of characteristic, a similarity of the amount of feature $Y_j$ is calculated, finally calculated similarities are summed up, and an averaged similarity is calculated as a relative evaluation score.

[Other]

The relative evaluation score may be a ratio using an absolute evaluation score calculated by the absolute evaluating unit 331 for each of the registered images R.

As described above, although several candidates are given as a method of calculating a relative evaluation score, in the following description, the similarity will be mainly explained as a degree of approximation, i.e., the definition of a degree of approximation as in the case of the absolute evaluation score.

(Flow of Face Image Registering Process)

Figure 11:
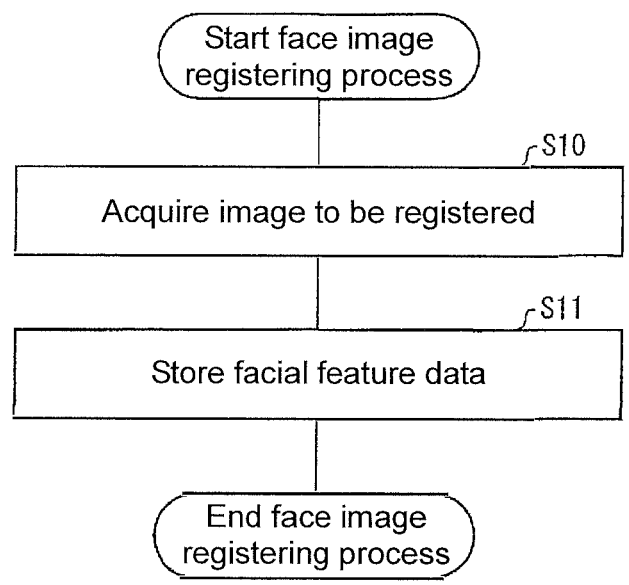
FIG. 11 is a flow chart illustrating a flow of a face image registering process in the face authentication device.

An example of a flow of a face image registering process that registers a photographic image obtained by photographing the face of a certain person as a registration target image will be described below with reference to FIG. 11. FIG. 11 is a flow chart illustrating a flow of a face image registering process in the face authentication device 1.

As illustrated in FIG. 11, in the face image registering process, the image acquiring unit 31 of the face authentication device 1 acquires the registration target image A2 from the image input device 5 (S10).

Subsequently, the facial feature data extracting unit 32 analyses the registration target image A2 to extract facial feature data related to the face of a person included in the registration target image A2. The facial feature data extracting unit 32 stores the extracted facial feature data in the registered image R (S11).

In this case, the face authentication device 1 stores the registration target image A2 in a "photographic image" and registers the registered image R in which the facial feature data is stored as "facial feature data" in the registered image database 21. The image acquiring unit 31 illustratively acquires a name (ID) of the registered personal information P from an input in the operation unit 11. The image acquiring unit 31 automatically generates identification information of the registered image. This is the end of the face image registering process.

(Flow of Face Image Authentication Process)

Figure 12:
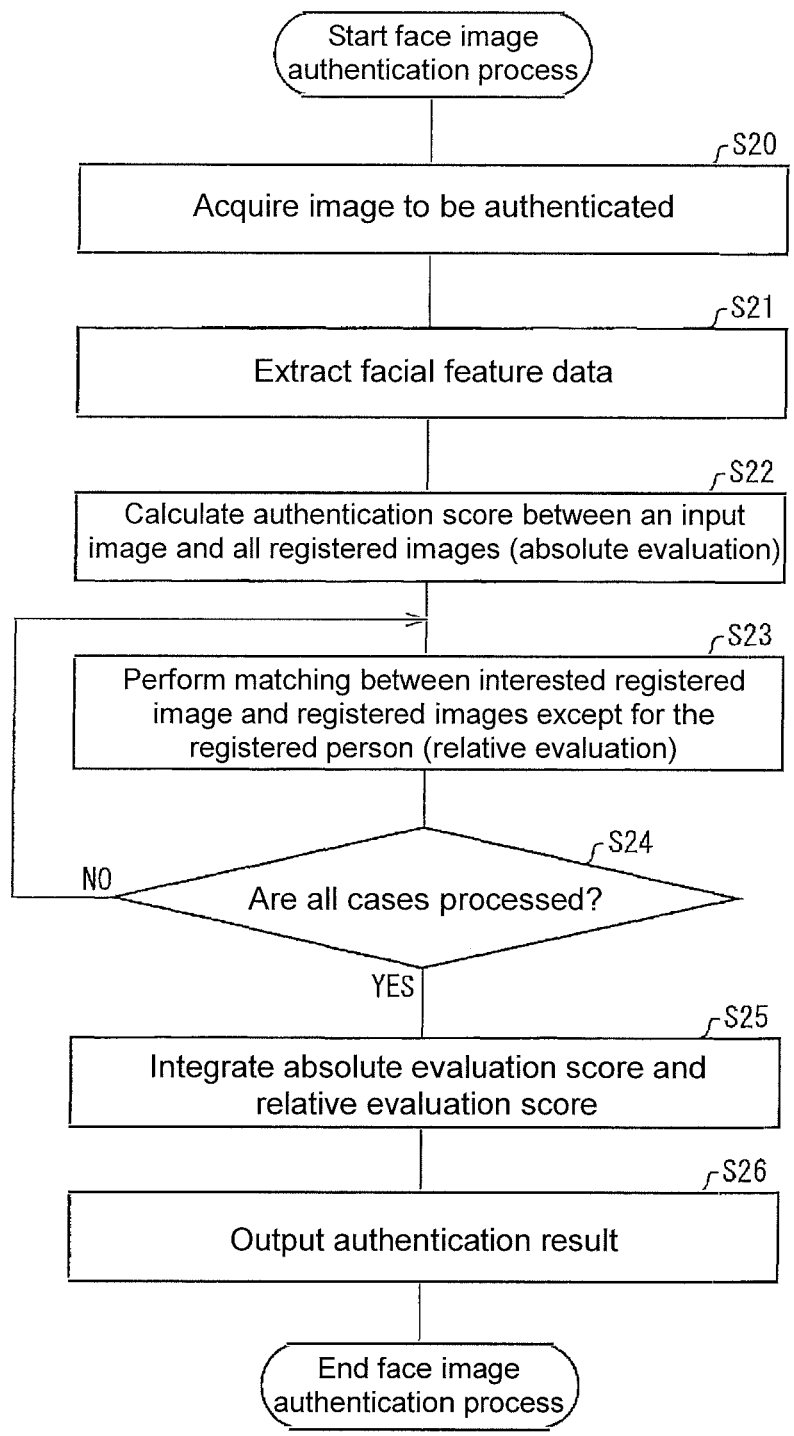
FIG. 12 is a flow chart illustrating a flow of a face image authentication process in the face authentication device.

A flow of a face image authentication process that authenticates a photographic image obtained by photographing the face of a certain person as an input image will be described below with reference to FIG. 12. FIG. 12 is a flow chart illustrating the flow of the face image authentication process in the face authentication device 1.

As illustrated in FIG. 12, in the face image authentication process, when the image acquiring unit 31 acquires the input image A1 inputted from the image input device 5 (S20), the input image A1 is transferred to the facial feature data extracting unit 32.

The facial feature data extracting unit 32 analyses the input image A1 to extract facial feature data from the input image A1 (S21).

The absolute evaluating unit 331 performs matching between the input image and each of the registered images to calculate absolute evaluation scores (S22).

The interested registered image selecting unit 332 selects one registered image as an interested registered image from the registered images registered in the registered image database 21, the other registered image selecting unit 333 selects a registered image of a registered person different from the registered person of the interested registered image as a selective registered image, and the relative evaluation unit 334 calculates a relative evaluation score between the interested registered image and the selective registered image (S23).

The calculation of the relative evaluation score is executed to the registered images of the remaining registered persons registered in the registered image database 21 (S24). When the relative evaluation scores of the registered images of all the registered persons different from the registered person of the interested registered image are calculated (YES in S24), the evaluation integrating unit 335 integrates the absolute evaluation score and the relative evaluation score with each other (S25).

The authentication result output unit 34, on the basis of the integrated score outputted from the evaluation integrating unit 335, authenticates the input image A1 to output an authentication result (S26). This is the end of the face image authentication process.

Example

A concrete example of the flow of the face image authentication process described with reference to FIG. 12 will be further described below with reference to FIG. 13 to FIG. 15.

Figure 13:
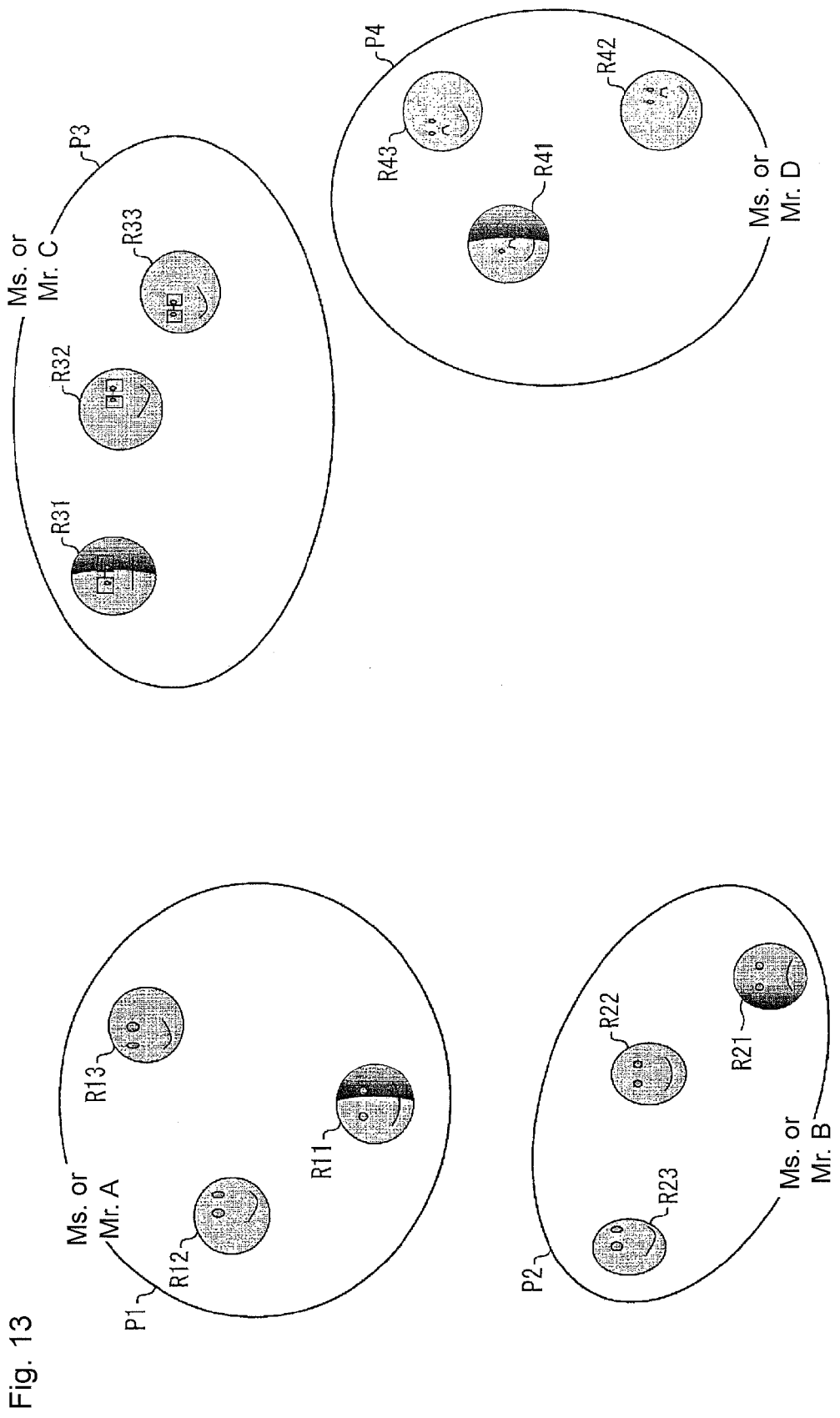
FIG. 13 is a diagram illustrating registered personal information registered in a registered image database according to an embodiment of the present invention.

In the example described below, as illustrated in FIG. 13, it is assumed that, in the registered image database 21, the registered personal information P1 (Ms. or Mr. A), P2 (Ms. or Mr. B), P3 (Ms. or Mr. C), and P4 (Ms. or Mr. D) are registered. As each of the pieces of registered personal information P1 to P4, three registered images (registered images R11 to R13, R21 to R23, R31 to R33, and R41 to R43) are registered.

When the input image A1 is inputted to extract the facial feature data of the input image A1 (S20 and S21), the absolute evaluating unit 331 performs matching between the input image and the registered images to calculate absolute evaluation scores (S22).

The matching process performed by the absolute evaluating unit 331 will be more concretely described below with reference to FIG. 14.

Figure 14:
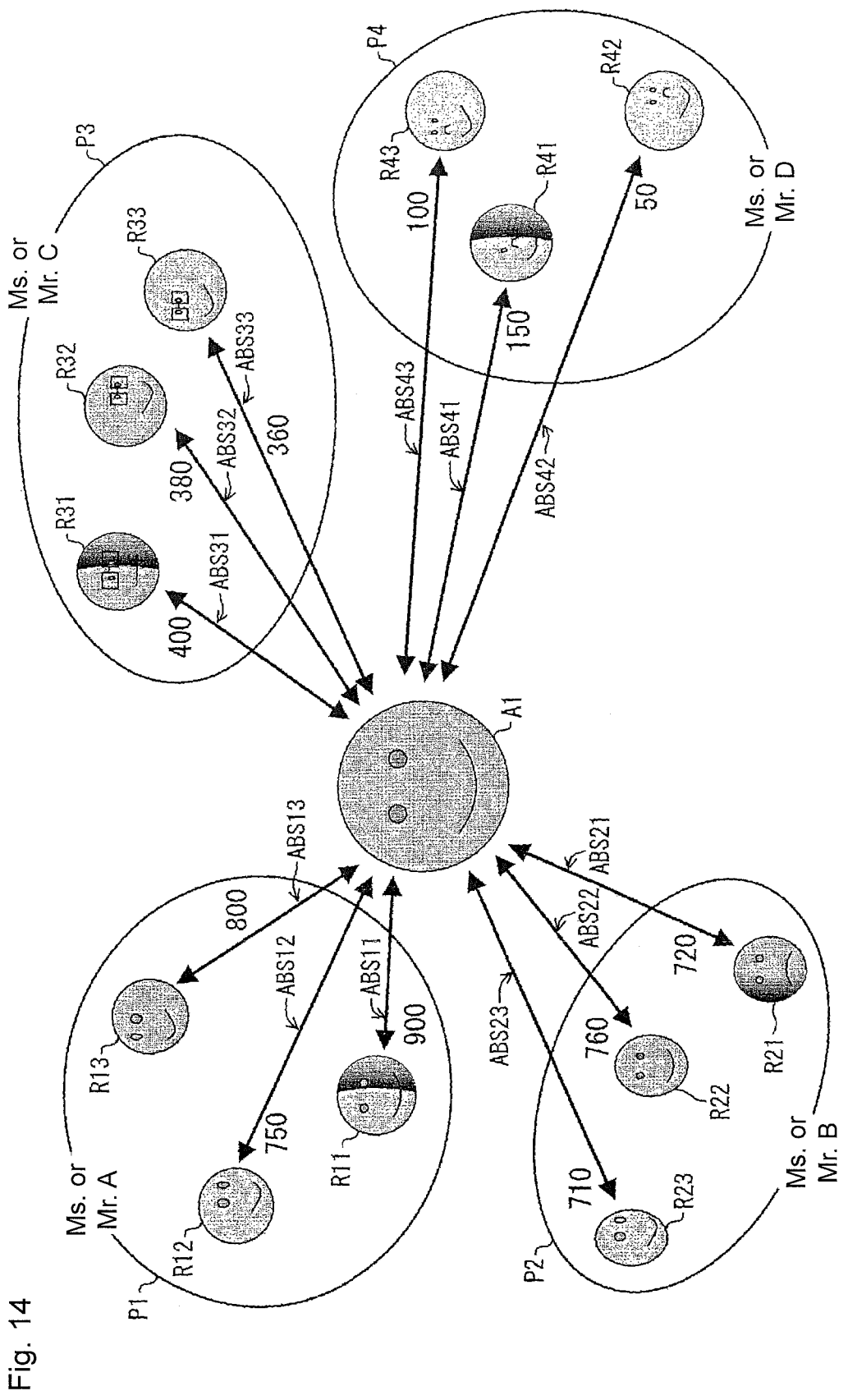
FIG. 14 is a diagram illustrating a case in which an absolute evaluation score is calculated on the basis of registered personal information of the registered image database.

As illustrated in FIG. 14, the absolute evaluating unit 331 performs matching between the registered images registered about the pieces of registered personal information P1 to P4, and the input image A1 to calculate an absolute evaluation score.

In FIG. 14, in the matching process performed by the absolute evaluating unit 331, a registered image serving as a comparison target and the input image A1 are illustrated such that the images are connected to each other with an arrow. In FIG. 14, as a registered image has a higher calculated absolute evaluation score, the registered image is illustrated to be located near the input image A1. More specifically, the length of the arrow represents an absolute evaluation score. The absolute evaluation score calculated by the absolute evaluating unit 331 is described near the arrow.

It is assumed that the absolute evaluation score illustratively ranges from "0" to "1000". For example, it is assumed that an absolute evaluation score having a higher value is calculated about a registered image on which a person similar to that of the input image A1.

More specifically, when the absolute evaluation score is "0", the score represents that the person of the registered image is rarely similar to the person of the input image. When the absolute evaluation score is "1000", the score represents that the person of the registered image is very similar to the person of the input image.

Absolute value scores calculated about the registered images of the pieces of registered personal information P1 to P4 will be described below.

Absolute evaluation scores ABS11, ABS12, and ABS13 of registered images R11, R12, and R13 of the registered personal information P1 (Ms. or Mr. A) are "900", "750", and "800", respectively.

Absolute scores ABS21, ABS22, and ABS23 of registered images R21, R22, and R23 of the registered personal information P2 (Ms. or Mr. B) are "720", "760", and "710", respectively.

Absolute scores ABS31, ABS32, and ABS33 of registered images R31, R32, and R33 of the registered personal information P3 (Ms. or Mr. C) are "400", "380", and "360", respectively.

Absolute scores ABS41, ABS42, and ABS43 of registered images R41, R42, and R43 of the registered personal information P4 (Ms. or Mr. D) are "150", "50", and "100", respectively.

The absolute evaluation score of "Ms. or Mr. A" falls within the range of "900" to "750", and the absolute evaluation score of "Ms. or Mr. B" falls within the range of "760" to "710".

"Ms. or Mr. A" and "Ms. or Mr. B" have relatively high absolute evaluation scores and are similar to the person of the input image A1.

"Ms. or Mr. A" and "Ms. or Mr. B" have the absolute evaluation scores having partially overlapping ranges, and close absolute evaluation scores are calculated. For this reason, it can be said that "Ms. or Mr. A" and "Ms. or Mr. B" are persons (for example, brothers) who are similar to each other.

In contrast to this, for "Ms. or Mr. C" and "Ms. or Mr. D", absolute evaluation scores lower than those of "Ms. or Mr. A" and "Ms. or Mr. B" are calculated, and the range of the values is "400" to "50". Thus, it can be said that "Ms. or Mr. C" and "Ms. or Mr. D" are not similar to the person of the input image and are not very similar to "Ms. or Mr. A" and "Ms. or Mr. B".

When the absolute evaluation scores are calculated, the relative evaluation unit 334 calculates a relative evaluation score between an interested registered image and a selective registered image (S23).

Calculation of a relative evaluation score in the relative evaluation unit 334 will be described below with reference to FIG. 15.

Figure 15:
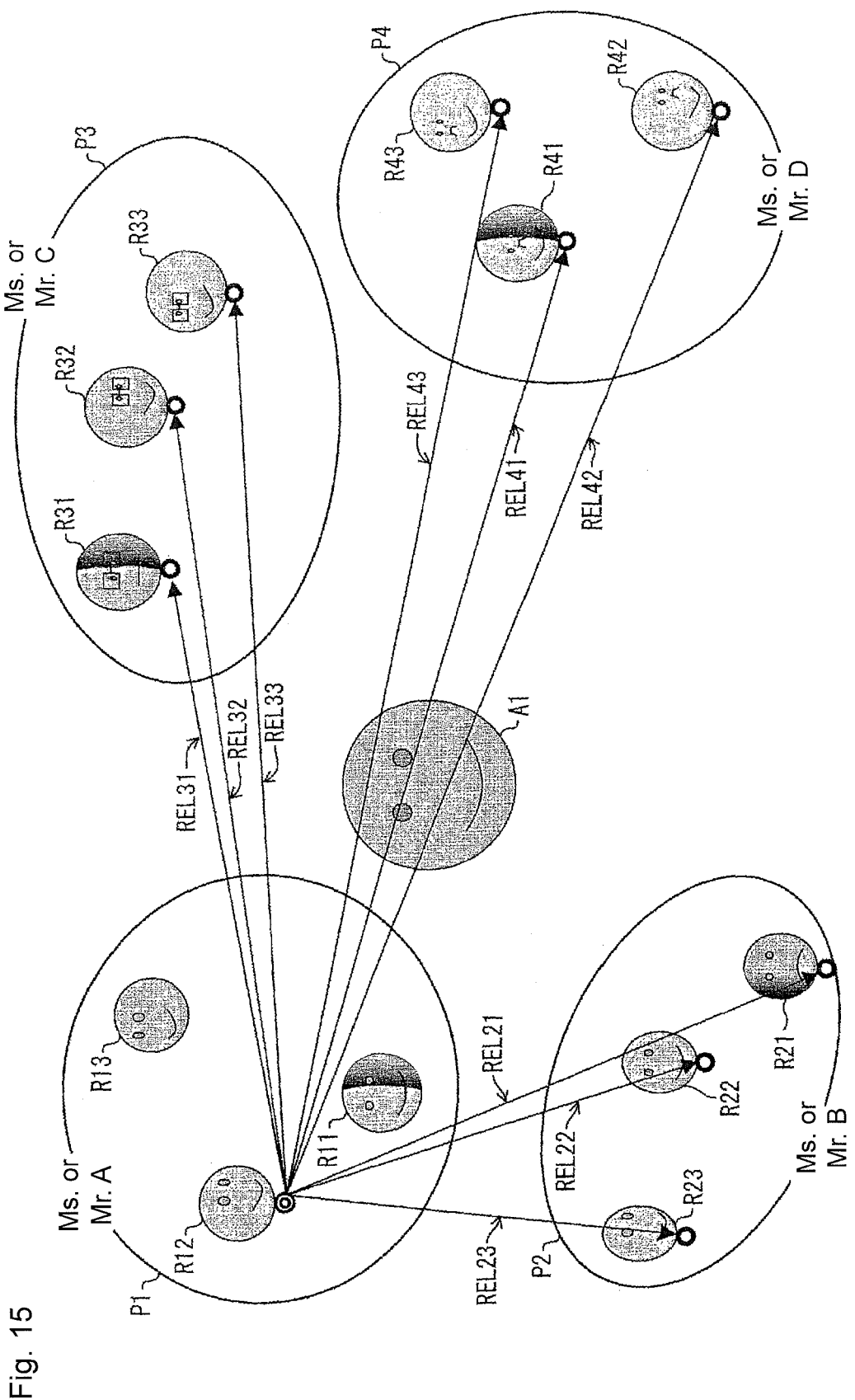
FIG. 15 is a diagram illustrating a case in which a relative evaluation score is calculated on the basis of registered personal information of the registered image database.

In the example illustrated in FIG. 15, the interested registered image selecting unit 332 selects the registered image R12 of "Ms. or Mr. A" as an interested registered image. The interested registered image selecting unit 332 selects, as an example, interested registered images in the order of registration of the registered images of the pieces of registered personal information P1 to P4.

In the example illustrated in FIG. 15, the registered images R12, R11, and R13 are registered in the order named. Thus, the registered image R12 registered at the start is selected by the interested registered image selecting unit 332.

The above configuration is not necessarily used, and, as a registered image selected as an interested registered image by the interested registered image selecting unit 332, for example, a registered image having the highest absolute evaluation score of the registered images of the pieces of registered personal information P1 to P4 may be used. In this case, in an explanation with reference to FIG. 15, the registered image R11 having the highest absolute evaluation score illustrated in FIG. 14 is selected in the pieces of registered personal information P1 to P4 by the interested registered image selecting unit 332.

A registered image may be selected as an interested registered image by the interested registered image selecting unit 332 with reference to registered personal information in which the registered image having the highest absolute evaluation score is registered. For example, in the registered personal information in which the registered image having the highest absolute evaluation score is registered, the registered image may have the highest absolute evaluation score or, in contrast to this, the lowest absolute evaluation score. For example, in the registered personal information in which the registered image having the highest absolute evaluation score is registered, a registered image in which a calculated absolute evaluation score exhibits a medium value may be used.

In the drawing, a double circle added below the registered image R12 indicates that the registered image R12 is an interested registered image.

In the example illustrated in FIG. 10, the other registered image selecting unit 333 selects registered images of a person except for "Ms. or Mr. A", i.e., the registered images of "Ms. or Mr. B", "Ms. or Mr. C", and "Ms. or Mr. D" as selective registered images. In the drawing, single circles added below the registered images of "Ms. or Mr. B", "Ms. or Mr. C", and "Ms. or Mr. D" indicate that the registered images are selective registered images.

The relative evaluation unit 334, with reference to the registered image R12 serving as an interested registered image, compares the registered images R21 to R23 of "Ms. or Mr. B" serving as selective registered images, the registered images R31 to R33 of "Ms. or Mr. C" serving as selective registered images, and the registered images R41 to R43 of "Ms. or Mr. D" serving as selective registered images with each other.

The relative evaluation unit 334 calculates relative evaluation scores on the basis of the comparisons. More specifically, by the comparison between the registered images R21 to R23 of "Ms. or Mr. B", relative evaluation scores REL21 to REL23 are calculated, respectively. By the comparison between the registered images R31 to R33 of "Ms. or Mr. C", relative evaluation scores REL31 to REL33 are calculated, respectively. By the comparison between the registered images R41 to R43 of "Ms. or Mr. D", relative evaluation scores REL41 to REL43 are calculated, respectively.

In this case, a method of calculating a relative evaluation score is the same as described with reference to FIG. 6 and FIG. 7. Facial feature data included in the registered images Rn of registered personal information Pn corresponds to an amount $Y_n$ of characteristic illustrated in FIG. 6 and FIG. 7.

The ranges of the absolute evaluation score and the relative evaluation score that are calculated as described above may be adjusted depending on calculating methods. More specifically, when the values of the absolute evaluation score and those of the relative evaluation score differ depending on the calculating methods, both the values are adjusted such that the values can be compared with each other.

For example, when the range of the value of the absolute evaluation score is 0 to 1000 and the range of the value of the relative evaluation score is 0 to 1, the ranges of the values are adjusted by multiplying the relative evaluation score by a coefficient of 1000.

In the following description, also for "Ms. or Mr. C" and "Ms. or Mr. D", as described about "Ms. or Mr. B", relative evaluation scores are calculated (S24). The relative evaluation score may be calculated while changing the interested registered images.

When the relative evaluation scores of all the cases are calculated, the evaluation integrating unit 335 integrates the absolute evaluation score and the relative evaluation scores with each other (S25). The evaluation integrating unit 335, for example, according to the following equation (1), calculates an integrated score (T) for each of the registered images.

$$T = w \times ABS + (1-w) REL \quad (1)$$

Note that ABS: absolute evaluation score, REL: relative evaluation score, and w: weight ($0 \leq w \leq 1$)

Even though the range of the relative evaluation score is not equal to the range of the absolute evaluation score, the difference between both the ranges can be adjusted by w.

The authentication result output unit 34, on the basis of the integrated score (T) outputted from the evaluation integrating unit 335, authenticates the input image A1 to output an authentication result (S26).

(Function—Effect).

As described above, the face authentication device 1 that checks the input image A1 obtained by photographing the face of a person against the registered image database 21 in which the registered image R including the facial feature data is registered, includes: the absolute evaluating unit 331 that calculates an absolute evaluation score between the facial feature data A11 of the input image A1 and the facial feature data included in the registered image R of the registered personal information P registered in the registered image database 21; the relative evaluation unit 334 that calculates a relative evaluation score that is a score representing a degree of approximation between the person of one piece of registered personal information P registered in the registered image database 21 and the person of the input image A1 in comparison with the person of another piece of registered personal information P; an evaluation integrating unit that calculates an integrated score obtained by weighting and integrating the absolute evaluation score and the relative evaluation score; and an authentication result output unit 34 that verifies the input image A1.

Thus, as described above, since authentication is performed by using the integrated score, an identification rate for similar persons (for example, Ms. or Mr. A and Ms. or Mr. B) who may be erroneously discriminated from each other when verification is performed by using only an absolute evaluation score can be increased.

As described above, in the face authentication device 1, the absolute evaluating unit 331 calculates an absolute evaluation score between the input image A1 and a registered image (for example, the registered image R11) having facial feature data extracted from one image obtained by photographing a person (Ms. or Mr. A or the like), and the relative evaluation unit 334 is configured to calculate the relative evaluation score by using a registered image having facial feature data extracted from one image obtained by photographing a person.

In the registered image database 21, only a registered image having facial feature data extracted from one image obtained by photographing a person is registered. Thus, even though the registered image R is not processed, scores are immediately calculated by using the registered image R that has been registered to make it possible to perform verification.

(Modification)

The relative evaluation unit 334 may use, as a processing target, a registered image having an absolute evaluation score equal to or larger than a predetermined threshold value. For example, the threshold value may be set to "500".

For example, the absolute evaluation scores ABS31 to ABS33 and ABS41 to ABS43 calculated about "Ms. or Mr. C" and "Ms. or Mr. D" illustrated in FIG. 14 are 500 or less. For example, in FIG. 15, "Ms. or Mr. C" and "Ms. or Mr. D" may be excluded from the targets for relative evaluation score calculation.

As described above, FIG. 14, since the absolute evaluation scores of the "Ms. or Mr. C" and the "Ms. or Mr. D" are calculated to be lower than those of the "Ms. or Mr. A" and "Ms. or Mr. B", it can be said that the possibility of erroneous authentication is low.

Thus, according to the modification, processes to "Ms. or Mr. C" and "Ms. or Mr. D" who are slightly erroneously authenticated can be omitted as described above. For this reason, simplification and an increase in speed of the processes can be achieved.

Embodiment 2

Another embodiment of the present invention will be described below with reference to FIG. 16 to FIG. 20. For the descriptive convenience, the same reference symbols denote the members having the same functions as described in the above embodiment, and a description thereof will be omitted.

In the face authentication device according to an embodiment of the present invention, a typical face image is calculated for each of the pieces of registered personal information P, and a relative evaluation score is calculated on the basis of the calculated typical face image. An explanation will be made with a focus on a method of calculating a relative evaluation score.

Figure 16:
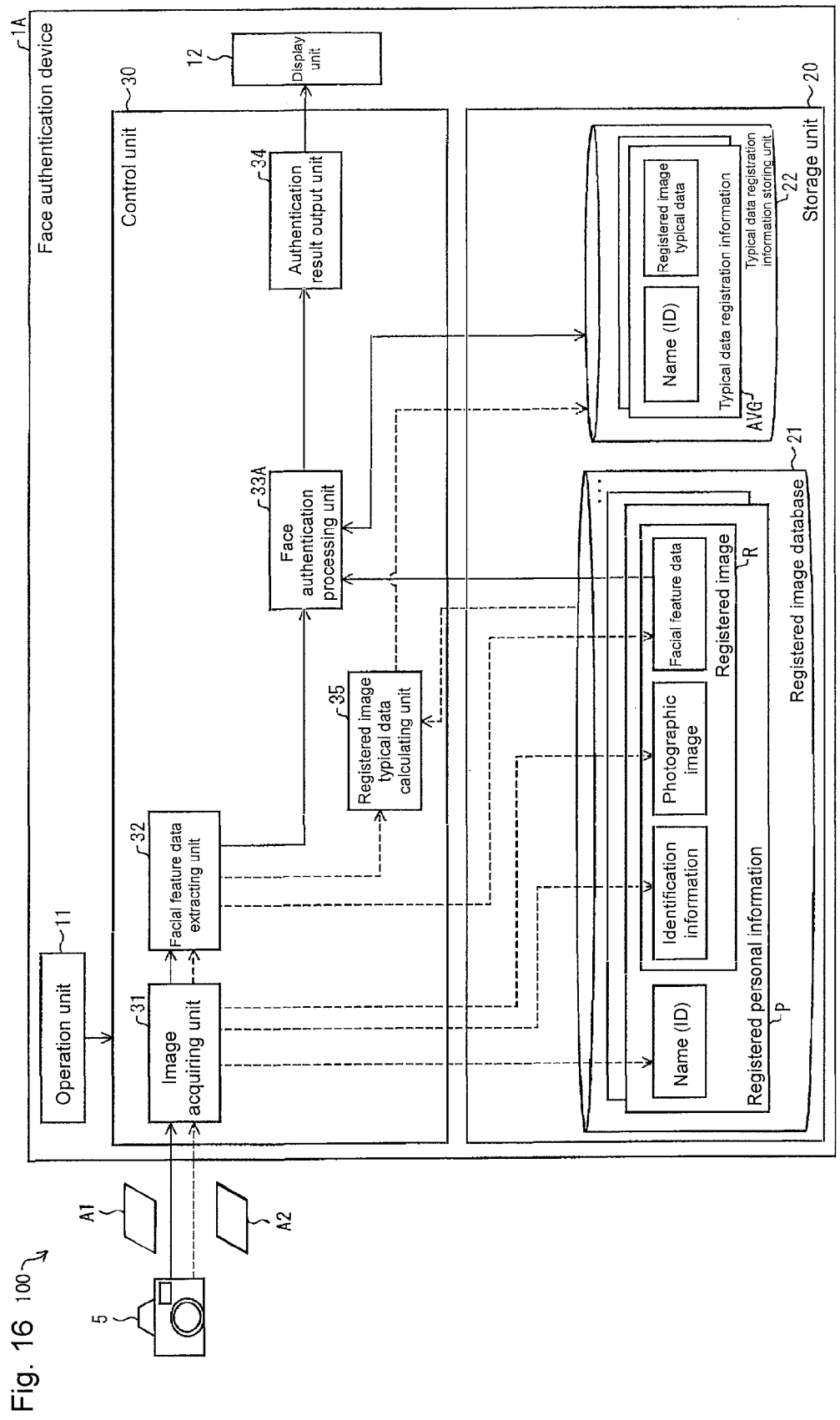
FIG. 16 is a block diagram illustrating a configuration of a face authentication system including a face authentication device according to another embodiment of the present invention.

A configuration of a face authentication device (image verification device) 1A will be described below with reference to FIG. 16. The face authentication device 1A illustrated in FIG. 16 is different from the face authentication device 1 described above in the following points.

More specifically, the face authentication device 1A is obtained such that, in the control unit 30 of the face authentication device 1, the face authentication processing unit 33 is replaced with a face authentication processing unit 33A, a registered image typical data calculating unit 35 is added, and a typical data registration information storing unit (registered image database) 22 is added to the storage unit 20. These different points will be described below.

In the typical data registration information storing unit 22, typical data registration information (typical image) AVG serving as registration information of a typical face image calculated from a registered image registered in the registered personal information P is stored. As illustrated in FIG. 16, the typical data registration information AVG has a data structure including a name (ID) and registered image typical data.

The name (ID) is information to identify the typical data registration information. The name (ID) of a corresponding registered personal information P is stored.

In the registered image typical data, a typical face image calculated from the registered image registered in the registered personal information P is stored. In the following description, as one example, it is assumed that the registered image typical data is calculated from facial feature data of the registration target image A2. The registered image typical data is not limited to the registered image typical data described above, and the registered image typical data may be calculated from pixel data of the registration target image A2.

The registered image typical data calculating unit 35, in a "face image registering process", calculates the registered image typical data by using the facial feature data extracted from the registration target image A2.

It is assumed that the registered image typical data calculating unit 35 illustratively calculates an average value of the facial feature data of the registered image R and the facial feature data of the registration target image A2 as registered image typical data. However, the registered image typical data calculating unit 35 is not limited to the above configuration, and the registered image typical data calculating unit 35 may calculate a maximum value or a minimum value of the absolute evaluation scores of the facial feature data of the registered image R and the facial feature data of the registration target image A2 as registered image typical data.

In addition to this, the registered image typical data calculating unit 35 may calculate a medium value of the facial feature data of the registered image R and the facial feature data of the registration target image A2 as registered image typical data.

The registered image typical data calculating unit 35, in the operation unit 11, associates the name (ID) of an input person with the registered image typical data and registers the name and the registered image typical data in the typical data registration information storing unit 22 as the typical data registration information AVG.

The face authentication processing unit 33A and the face authentication processing unit 33 are common in the respect that matching between an input image and a registered image and evaluation between the registered images are performed to calculate an integrated score representing the degree of approximation between both the images. On the other hand, the face authentication processing unit 33A is different from the face authentication processing unit 33 in that, in integrated score calculation, in addition to the registered image database 21, the typical data registration information storing unit 22 is referred to. A configuration of the face authentication processing unit 33A will be described below.

(Face Authentication Processing Unit)

Figure 17:
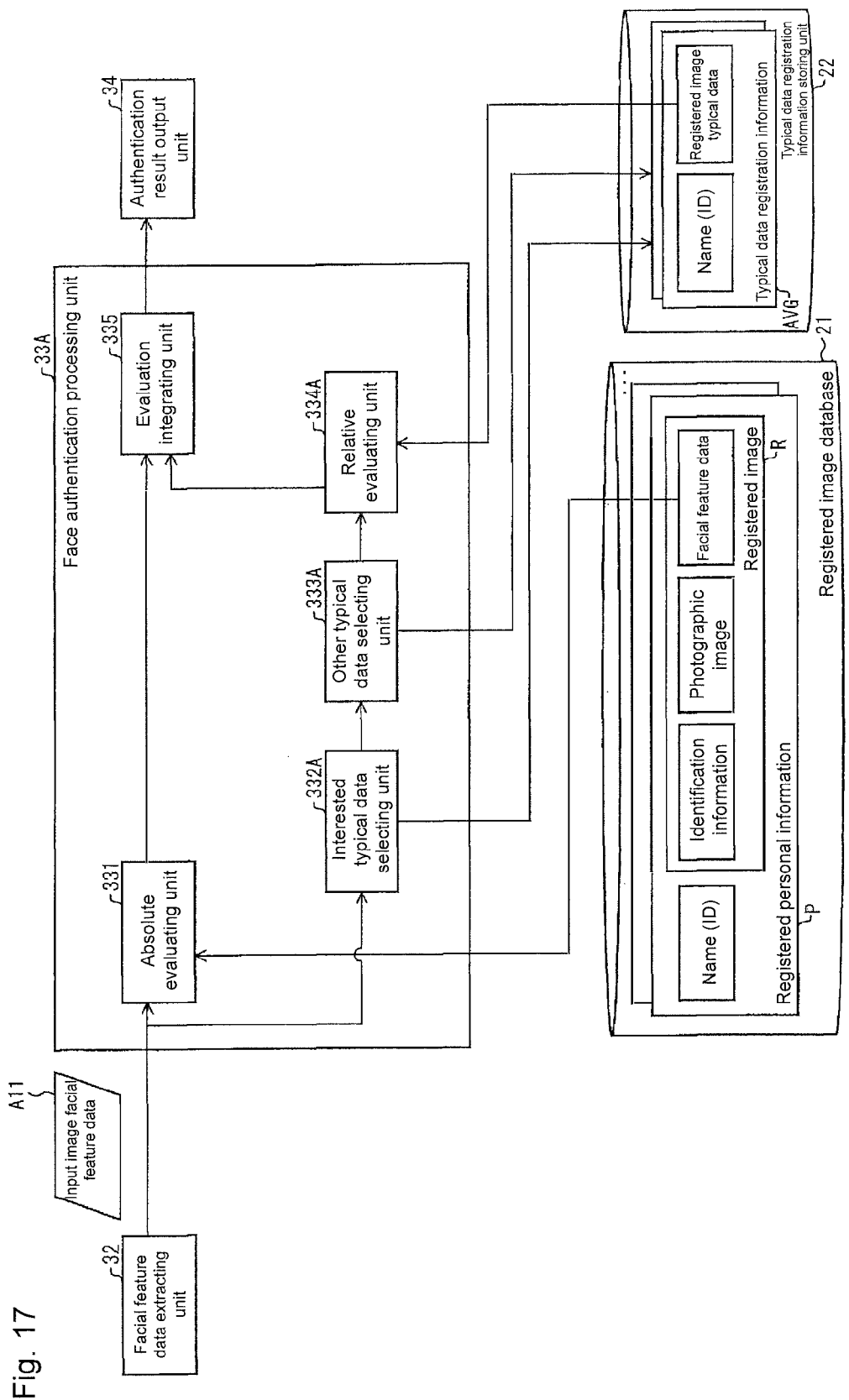
FIG. 17 is a functional block diagram illustrating an example of a schematic configuration of a face authentication processing unit included in the face authentication device.

A configuration of the face authentication processing unit 33A will be described with reference to FIG. 17. FIG. 17 is a functional block diagram showing an example of a schematic configuration of the face authentication processing unit 33A.

As illustrated in FIG. 17, the face authentication processing unit 33A is obtained such that, in the face authentication processing unit 33, the interested registered image selecting unit 332, the other registered image selecting unit 333, and the relative evaluation unit 334 are replaced with an interested typical data selecting unit (relative evaluation score calculating means) 332A, an other typical data selecting unit (relative evaluation score calculating means) 333A, and a relative evaluation unit (relative evaluation score calculating means) 334A, respectively.

The interested typical data selecting unit 332A selects interested typical data serving as registered image typical data that is used as a reference of score evaluation by the relative evaluation unit 334A from registered image typical data registered in the typical data registration information storing unit 22. The interested typical data selecting unit 332A can employ the same selecting method as that of the interested registered image selecting unit 332.

The other typical data selecting unit 333A selects selective typical data serving as registered image typical data that is a target compared with the interested typical data from the registered image typical data registered in the typical data registration information storing unit 22. The other typical data selecting unit 333A can employ the same selecting method as that of the other registered image selecting unit 333.

The relative evaluation unit 334A compares the interested typical data with the selective typical data to evaluate a relative relationship between the interested typical data and the selective typical data. The relative evaluation unit 334A calculates a relative evaluation score representing a degree of similarity between the person indicated by the interested typical data and a person photographed as an input image in comparison with a person indicated by the selective typical data. The other points are the same as those in the relative evaluation unit 334.

For example, the relative evaluation unit 334A can employ the same method of calculating a relative evaluation score as that of the relative evaluation unit 334. More specifically, the relative evaluation unit 334A can calculate a relative evaluation score by the method illustrated in FIG. 6 and FIG. 7. In this case, registered image typical data of the typical data registration information AVG corresponds to the amount $Y_n$ of characteristic in FIG. 6 and FIG. 7.

(Flow of Face Image Registering Process)

Figure 18:
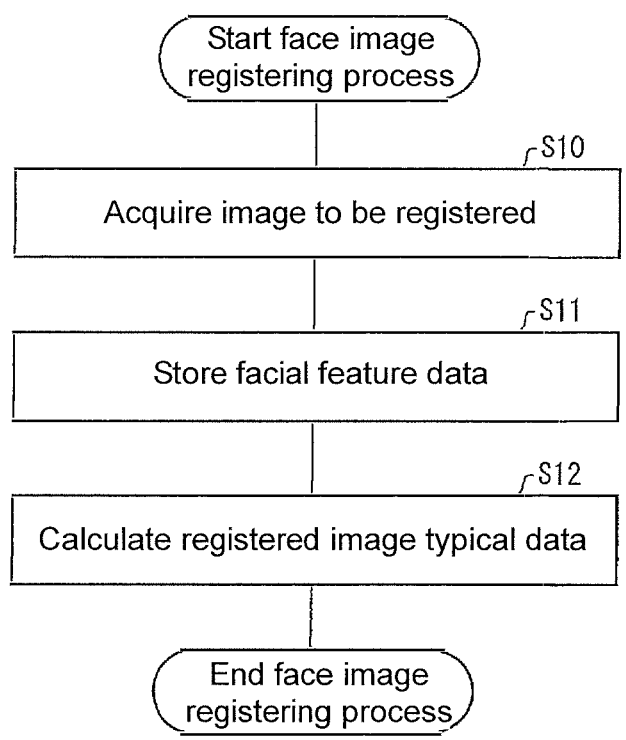
FIG. 18 is a flow chart illustrating a flow of a face image registering process in the face authentication device.

Another example of a flow of a face image registering process that registers a photographic image obtained by photographing the face of a certain person as a registration target image will be described below with reference to FIG. 18. FIG. 18 is a flow chart illustrating a flow of a face image registering process in the face authentication device 1A.

Steps S10 and S11 are the same as described with reference to FIG. 11, a description thereof will be omitted. In step S12 subsequent to step S11, the registered image typical data calculating unit 35 calculates registered image typical data by using the facial feature data of the registered image R and the facial feature data extracted from the registered target image A2. This is the end of the face image registering process.

(Flow of Face Image Authentication Process)

Figure 19:
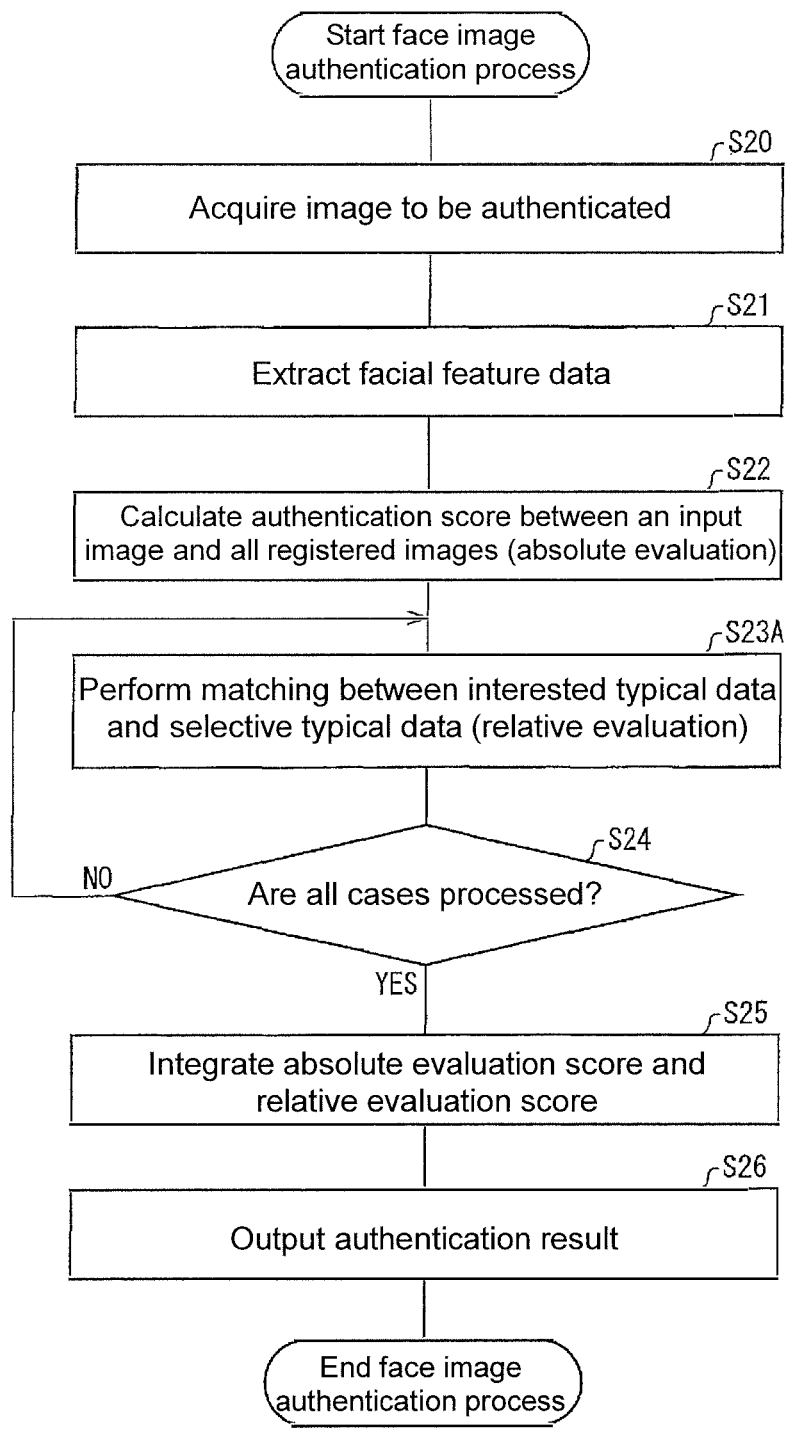
FIG. 19 is a flow chart illustrating a flow of a face image authentication process in the face authentication device.

A flow of a face image authentication process that authenticates a photographic image obtained by photographing the face of a certain person as an input image will be described below with reference to FIG. 19. FIG. 19 is a flow chart illustrating a flow of a face image authentication process in the face authentication device 1A. The flow chart illustrated in FIG. 19 is obtained by replacing step S23 of the flow chart illustrated in FIG. 12 with step S23A.

Steps S20 to S22 are the same as described with reference to FIG. 12, and a description thereof will be omitted.

The interested typical data selecting unit 332A selects registered image typical data of one registered person as interested typical data from the registered image typical data registered in the typical data registration information storing unit 22, the other typical data selecting unit 333A selects registered image typical data of a typical person different from the registered person of the interested typical data as selective typical data, and the relative evaluation unit 334A calculates a relative evaluation score between the interested typical data and the selective typical data (S23A).

Furthermore, the calculation of the relative evaluation score is executed about registered image typical data of the remaining registered persons (S24). When the relative evaluation scores of the registered image typical data of all the registered persons different from the registered person of the interested typical data are calculated (YES in S24), the evaluation integrating unit 335 integrates the absolute evaluation score and the relative evaluation score with each other (S25).

The authentication result output unit 34, on the basis of the integrated score outputted from the evaluation integrating unit 335, authenticates the input image A1 to output an authentication result (S26). This is the end of the face image authentication process.

Example

A concrete example of the flow of the face image authentication process described with reference to FIG. 19 will be further described below with reference to FIG. 20.

Figure 20:
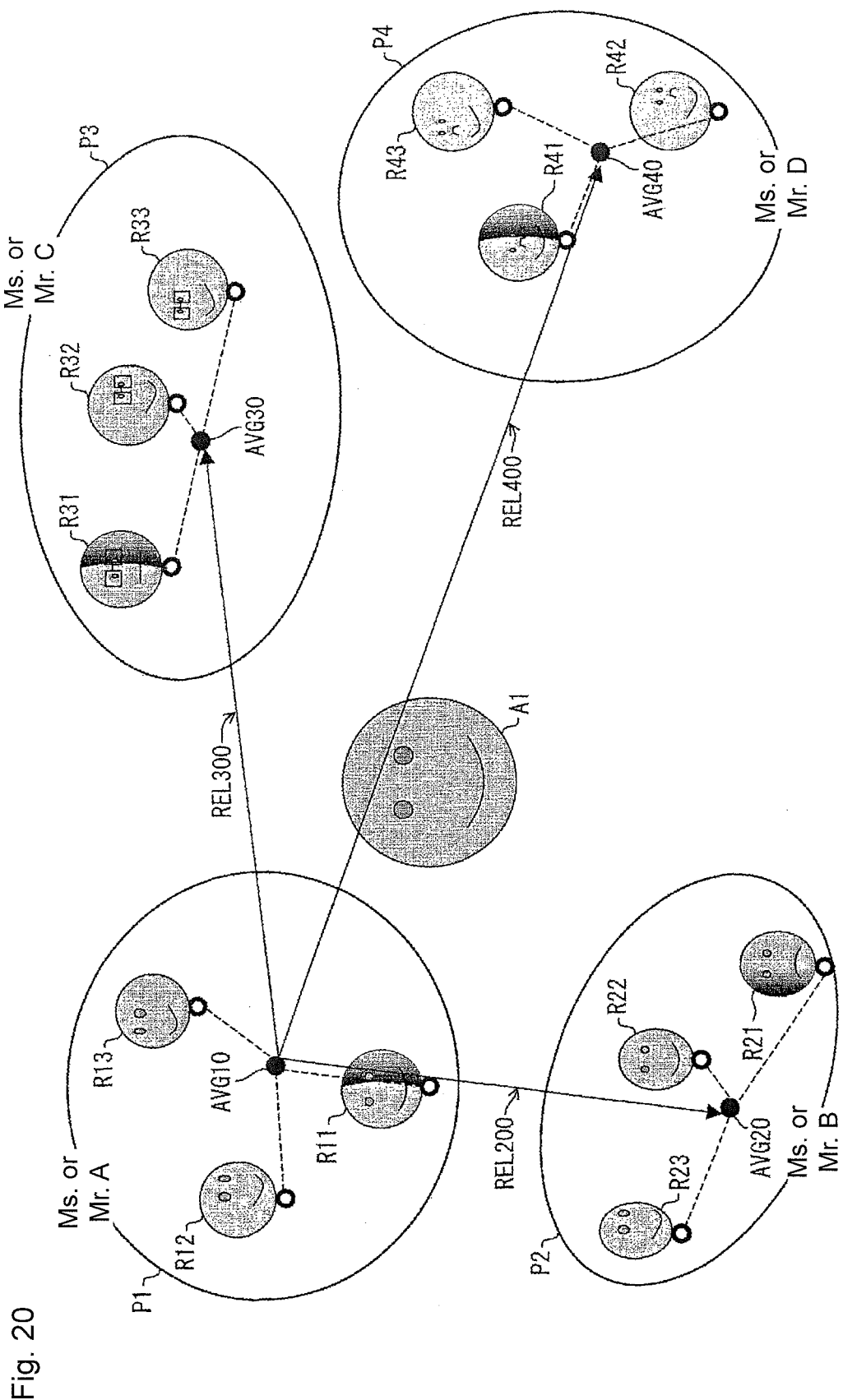
FIG. 20 is a diagram illustrating a case in which a relative evaluation score is calculated on the basis of registered personal information of the registered image database according to an embodiment of the present invention.

In the example described below, as illustrated in FIG. 20, it is assumed that, in the registered image database 21, the registered personal information P1 (Ms. or Mr. A), P2 (Ms. or Mr. B), P3 (Ms. or Mr. C), and P4 (Ms. or Mr. D) are registered. The pieces of registered personal information P1 to P4 are the same as those illustrated in FIG. 13.

Furthermore, in the typical data registration information storing unit 22, as illustrated in FIG. 20, pieces of typical data registration information AVG10 to AVG40 corresponding to the pieces of registered personal information P1 to P4 are registered. In FIG. 20, the pieces of typical data registration information AVG10 to AVG40 are indicated by black circles.

As described above, the registered image typical data calculating unit 35 calculates an average value of the facial feature data of the registered image R of the registered personal information P and the facial feature data of the registration target image A2 as registered image typical data. Thus, as one example, the typical data registration information AVG10 includes an average value of the facial feature data of the registered images R11 to R13 as registered image typical data.

A description will be performed along steps of the flow chart illustrated in FIG. 19. Concrete examples of steps S20 to S22 are the same as described with reference to FIG. 12 to FIG. 15, and a description thereof will be omitted.

In subsequent step S23A, the relative evaluation unit 334A calculates a relative evaluation score between the interested typical data and the selective typical data. In FIG. 19, it is assumed that the interested typical data is registered image typical data of the typical data registration information AVG10 and that the selective typical data is registered image typical data of the typical data registration information AVG20 to AVG40.

The relative evaluation unit 334A compares the registered image typical data of the typical data registration information AVG10 serving as the interested typical data with the registered image typical data of the pieces of typical data registration information AVG20, AVG30, and AVG40 serving as the selective typical data.

The relative evaluation unit 334A, on the basis of the comparison result, calculates relative evaluation scores REL200, REL300, and REL400.

A concrete method of calculating the relative evaluation scores REL200, REL300, and REL400 are the same as described with reference to FIG. 6, FIG. 7, and the like, and a description thereof will be omitted.

The relative evaluation unit 334A, in this manner, calculates the relative evaluation scores REL200, REL300, and REL400 about "Ms. or Mr. B", "Ms. or Mr. C", and "Ms. or Mr. D" (S24).

Concrete examples of steps S25 to S26 are the same as described with reference to FIG. 12 to FIG. 15, and a description thereof will be omitted.

(Function—Effect)

As described above, the face authentication device 1A has a configuration in which the relative evaluation unit 334A calculates a relative evaluation score by using typical data registration information having facial feature data that typifies the plurality of registered images R registered about persons.

With the above configuration, since a relative evaluation score is calculated by using a verification score calculated by using the typical data registration information AVG, a processing load in calculation of the relative evaluation score can be reduced.

(Modification)

A modification of the face authentication device 1A will be described below.

[Modification of Typical Data]

In the face authentication processing unit 33A, typical data of a plurality of persons different from a registered person of interested typical data may be formed. For example, as the typical data of the plurality of registered persons, all-other-person typical data serving as typical data of all the registered persons may be formed.

The all-other-person typical data can be formed by calculating an average value of typical data of a plurality of registered persons different from a registered person of interested typical data.

The other typical data selecting unit 333A may select the all-other-person typical data as selective typical data.

According to the above configuration, when Method 1 of the above relative evaluation score calculating method is employed, relative evaluation scores can be calculated without performing projection for the number of times of which is equal to the number of registered persons different from the registered person of the interested typical data.

Also in Method 2 described above, a relative evaluation score can be calculated without performing distance calculation or similarity calculation for the number of times of which is equal to the number of registered persons different from the registered person of the interested typical data.

Also in Method 3 described above, a relative evaluation score can be calculated without forming identification spaces for the number of which is equal to the number of registered persons different from the registered person of the interested typical data.

In the modification, in other words, it can also be said that projection, distance/similarity calculation, or formation of identification spaces is performed to characteristic spaces of a plurality of registered persons different from the registered person of the interested typical data.

[Modification of Registration of Typical Data Registration Information]

The registered image typical data calculating unit 35 may register the typical data registration information AVG as described below.

More specifically, the registered image typical data calculating unit 35 checks the facial feature data of the registration target image A2 supplied from the facial feature data extracting unit 32 against the registered image database 21 to specify a registered person. The registered image typical data calculating unit 35 calculates registered image typical data by using the registered image R and the registration target image A2 registered about a specific person. The registered image typical data calculating unit 35 associates the name (ID) of the specified person with the registered image typical data and registers the name and the registered image typical data in the typical data registration information storing unit 22 as the typical data registration information AVG.

Embodiment 3

Another embodiment of the present invention will be described below with reference to FIG. 21 to FIG. 24. For the descriptive convenience, the same reference symbols denote the members having the same functions as described in the above embodiments, and a description thereof will be omitted.

In the face authentication device according to an embodiment of the present invention, a typical face image is calculated for each of the pieces of registered personal information P, and an absolute evaluation score is calculated on the basis of the calculated typical face image. An explanation will be made with a focus on a method of calculating an absolute evaluation score.

Figure 21:
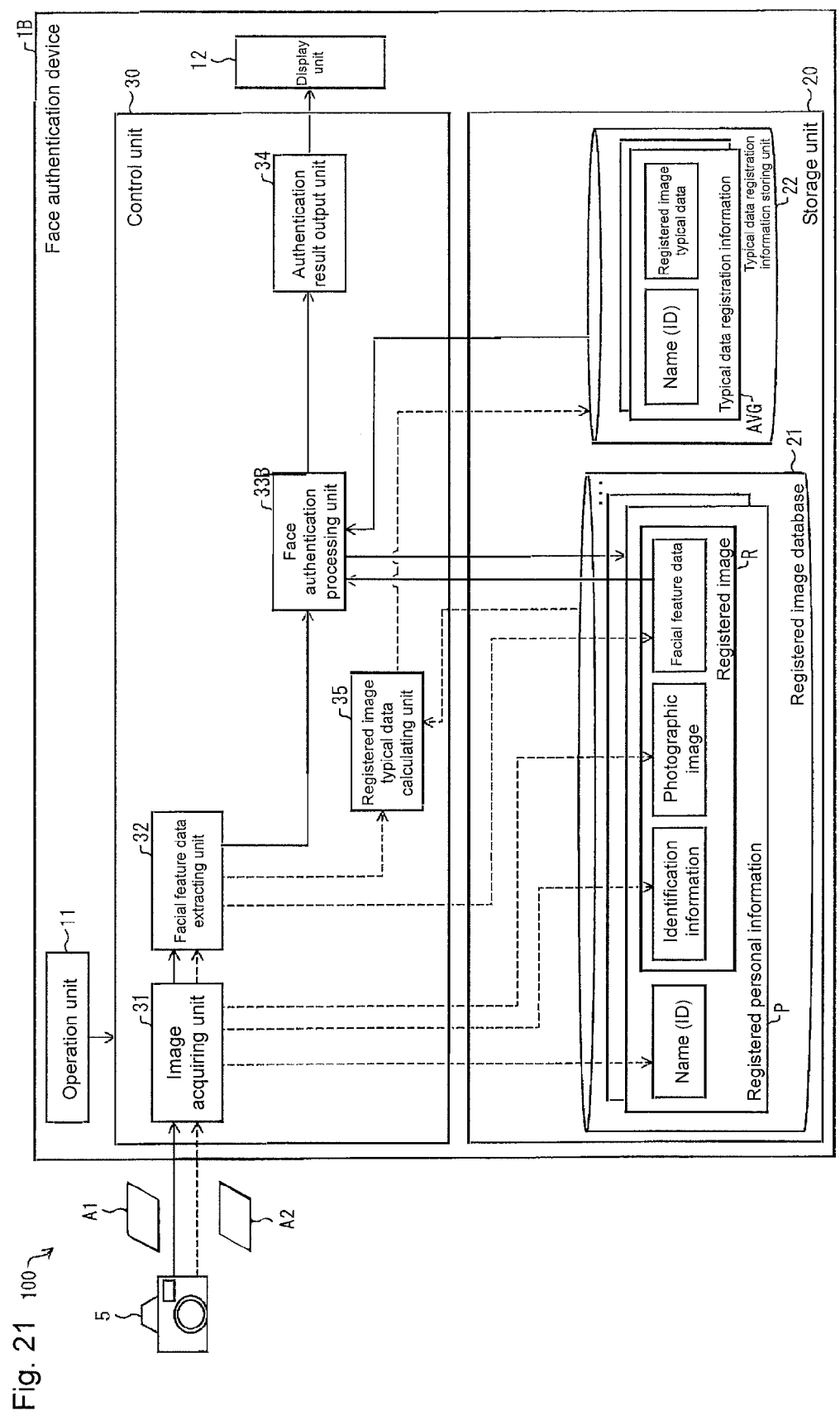
FIG. 21 is a block diagram illustrating a configuration of a face authentication system including a face authentication device according to still another embodiment of the present invention.

A configuration of a face authentication device (image verification device) 1B will be described below with reference to FIG. 21. The face authentication device 1B illustrated in FIG. 21 is different from the face authentication device 1A described above in the following points.

More specifically, the face authentication device 1B is obtained such that, in the control unit 30 of the face authentication device 1A, the face authentication processing unit 33A is replaced with the face authentication processing unit 33B.

In the face authentication processing unit 33B, a registered image is used for calculation of an absolute evaluation score. Unlike the face authentication processing unit 33A using typical data registration information in calculation of a relative evaluation score, the face authentication processing unit 33B uses the typical data registration information in calculation of the absolute evaluation score and uses the registered image in calculation of the relative evaluation score. A configuration of the face authentication processing unit 33B will be described below.

(Face Authentication Processing Unit)

Figure 22:
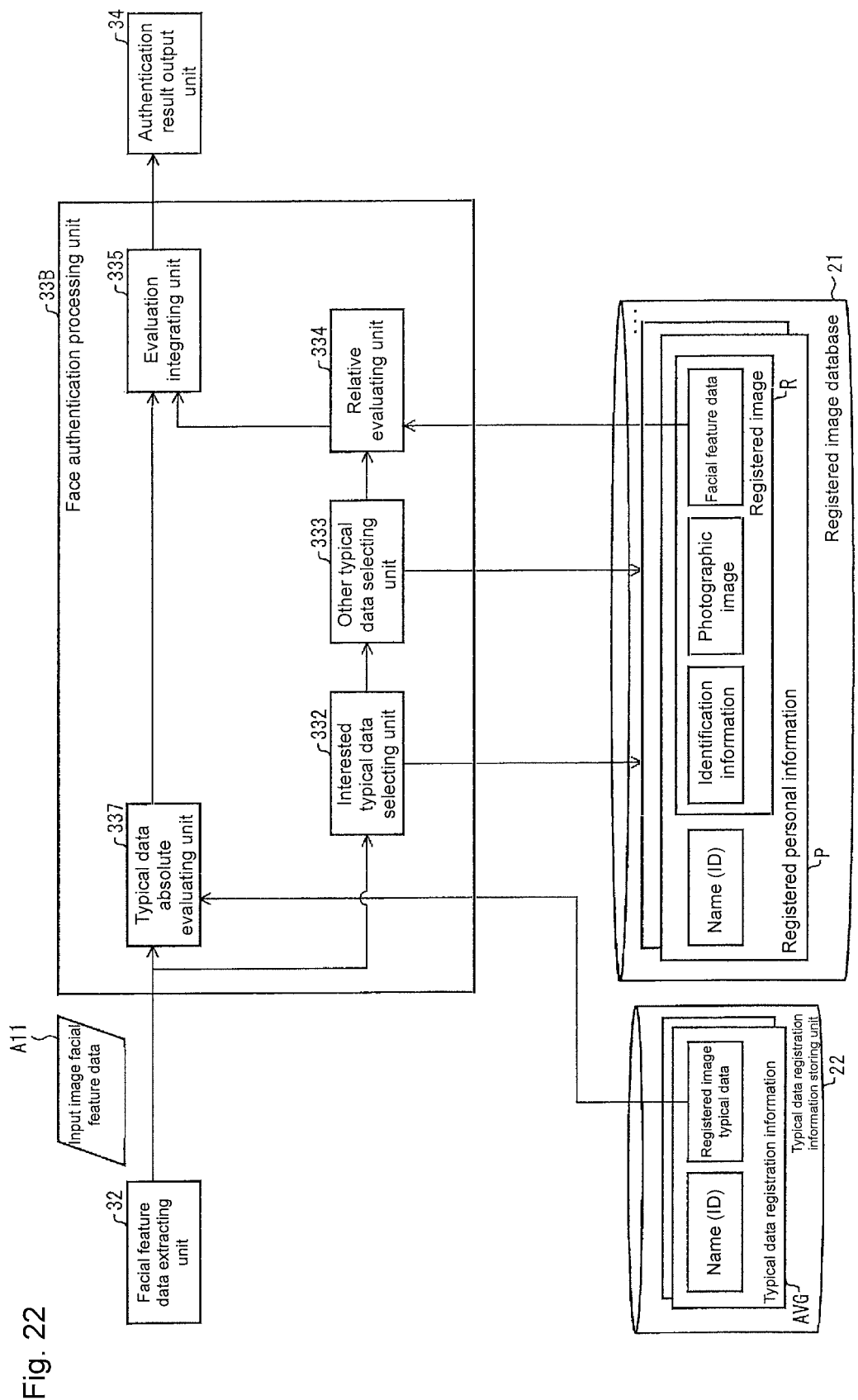
FIG. 22 is a functional block diagram illustrating an example of a schematic configuration of a face authentication processing unit included in the face authentication device.

A configuration of the face authentication processing unit 33B will be described with reference to FIG. 22. FIG. 22 is a functional block diagram showing an example of a schematic configuration of the face authentication processing unit 33B.

As illustrated in FIG. 22, the face authentication processing unit 33B is obtained such that, in the face authentication processing unit 33, the absolute evaluating unit 331 is replaced with a typical data absolute evaluating unit (verification score calculating means) 337.

The typical data absolute evaluating unit 337 performs matching between an input image and typical data registration information to calculate an absolute evaluation score of typical data. As the verification score calculating method of the typical data absolute evaluating unit 337, the same method as that of the absolute evaluating unit 331 can be used. More specifically, the typical data absolute evaluating unit 337 can calculate a relative evaluation score by the method illustrated in FIG. 4 and FIG. 5. In this case, registered image typical data of the typical data registration information AVG corresponds to the amount Y of characteristic in FIG. 4 and FIG. 5.

The typical data absolute evaluating unit 337 supplies the calculated absolute evaluation score to the evaluation integrating unit 335.

The evaluation integrating unit 335 has the same configuration as described above except that an absolute value score is supplied from the typical data absolute evaluating unit 337.

(Flow of Face Image Registering Process)

A flow of a face image registering process in the face authentication device 1B is as described with reference to FIG. 18, and a description thereof will be omitted.

(Flow of Face Image Authentication Process)

Figure 23:
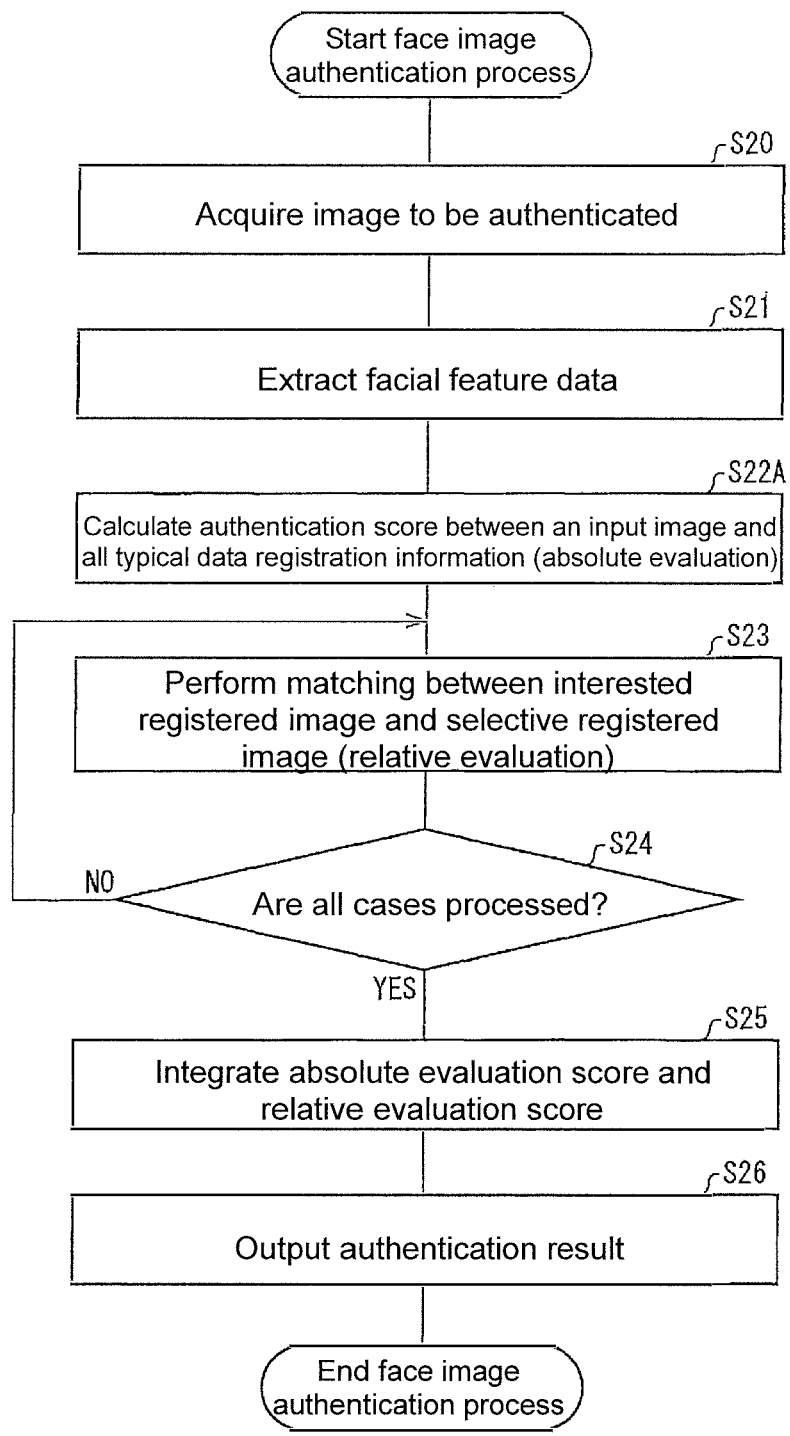
FIG. 23 is a flow chart illustrating a flow of a face image authentication process in the face authentication device.

Still another example of a flow of a face image authentication process that authenticates a photographic image obtained by photographing the face of a certain person as an input image will be described below with reference to FIG. 23. FIG. 23 is a flow chart illustrating a flow of a face image authentication process in the face authentication device 1A. The flow chart illustrated in FIG. 23 is obtained by replacing step S22 in the flow chart illustrated in FIG. 12 with step S22A.

Steps S20 and S21 are the same as described with reference to FIG. 12, and a description thereof will be omitted.

In step S22A, the typical data absolute evaluating unit 337 performs matching between an input image and pieces of typical data registration information to calculate absolute evaluation scores (S22A).

Subsequent steps S23 and S26 are the same as described with reference to FIG. 12, and a description thereof will be omitted.

Example

A concrete example of the flow of the face image authentication process described with reference to FIG. 23 will be further described below with reference to FIG. 24.

Figure 24:
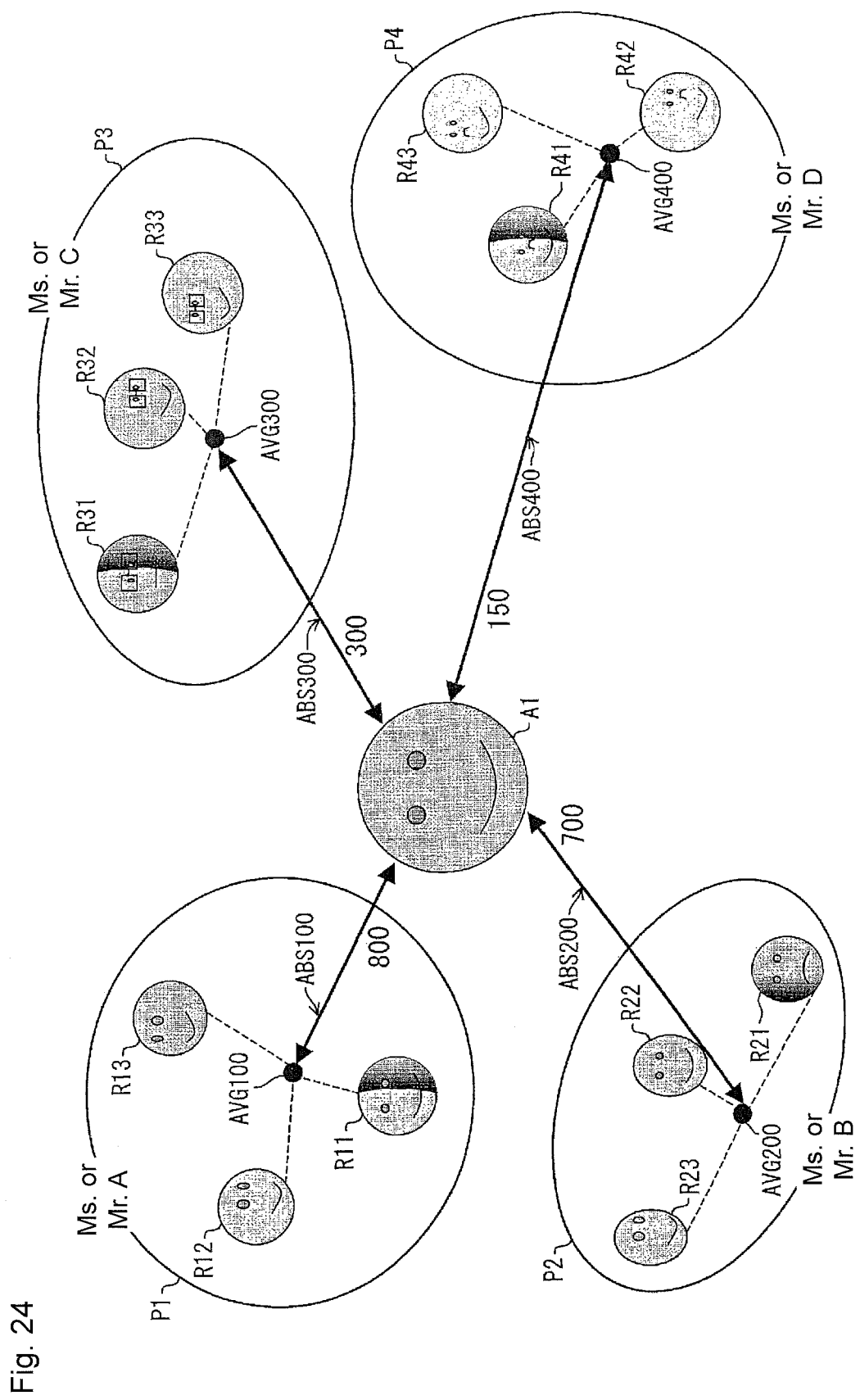
FIG. 24 is a diagram illustrating a case in which an absolute evaluation score is calculated on the basis of registered personal information of the registered image database according to an embodiment of the present invention.

In the example described below, in the registered image database 21, as illustrated in FIG. 24, it is assumed that, in the registered image database, the registered personal information P1 (Ms. or Mr. A), P2 (Ms. or Mr. B), P3 (Ms. or Mr. C), and P4 (Ms. or Mr. D) are registered. The pieces of registered personal information P1 to P4 are the same as those illustrated in FIG. 13.

Furthermore, in the typical data registration information storing unit 22, as illustrated in FIG. 24, pieces of typical data registration information AVG100 to AVG400 corresponding to the pieces of registered personal information P1 to P4 are registered. In FIG. 24, the pieces of typical data registration information AVG100 to AVG400 are indicated by black circles.

As described above, the registered image typical data calculating unit 35 calculates an average value of the facial feature data of the registered image R of the registered personal information P and the facial feature data of the registration target image A2 as registered image typical data. Thus, as one example, the typical data registration information AVG100 includes an average value of the facial feature data of the registered images R11 to R13 as registered image typical data.

A description will be performed along steps of the flow chart illustrated in FIG. 23. Steps S20 and S21 are the same as described with reference to FIG. 12 to FIG. 15, and a description thereof will be omitted.

In step S22A, the typical data absolute evaluating unit 337 performs matching between the input image A1 and the pieces of typical data registration information AVG100 to AVG400 to calculate absolute evaluation scores ABS100 to ABS400 for the pieces of the typical data registration information AVG100 to AVG400, respectively.

Subsequent steps S23 to S26 are the same as described with reference to FIG. 12 to FIG. 15, and a description thereof will be omitted.

(Function—Effect)

As described above, the face authentication device 1B has a configuration in which the typical data absolute evaluating unit 337 calculates absolute evaluation scores between the input image A1 and typical data registration information AVG having registered image typical data serving as facial feature data typifying the plurality of registered images R registered about persons.

According to the above configuration, since an absolute evaluation score is calculated for each of the pieces of registered personal information P by using the typical data registration information AVG, a processing load in calculation of the absolute evaluation scores can be reduced.

Embodiment 4

Figure 25:
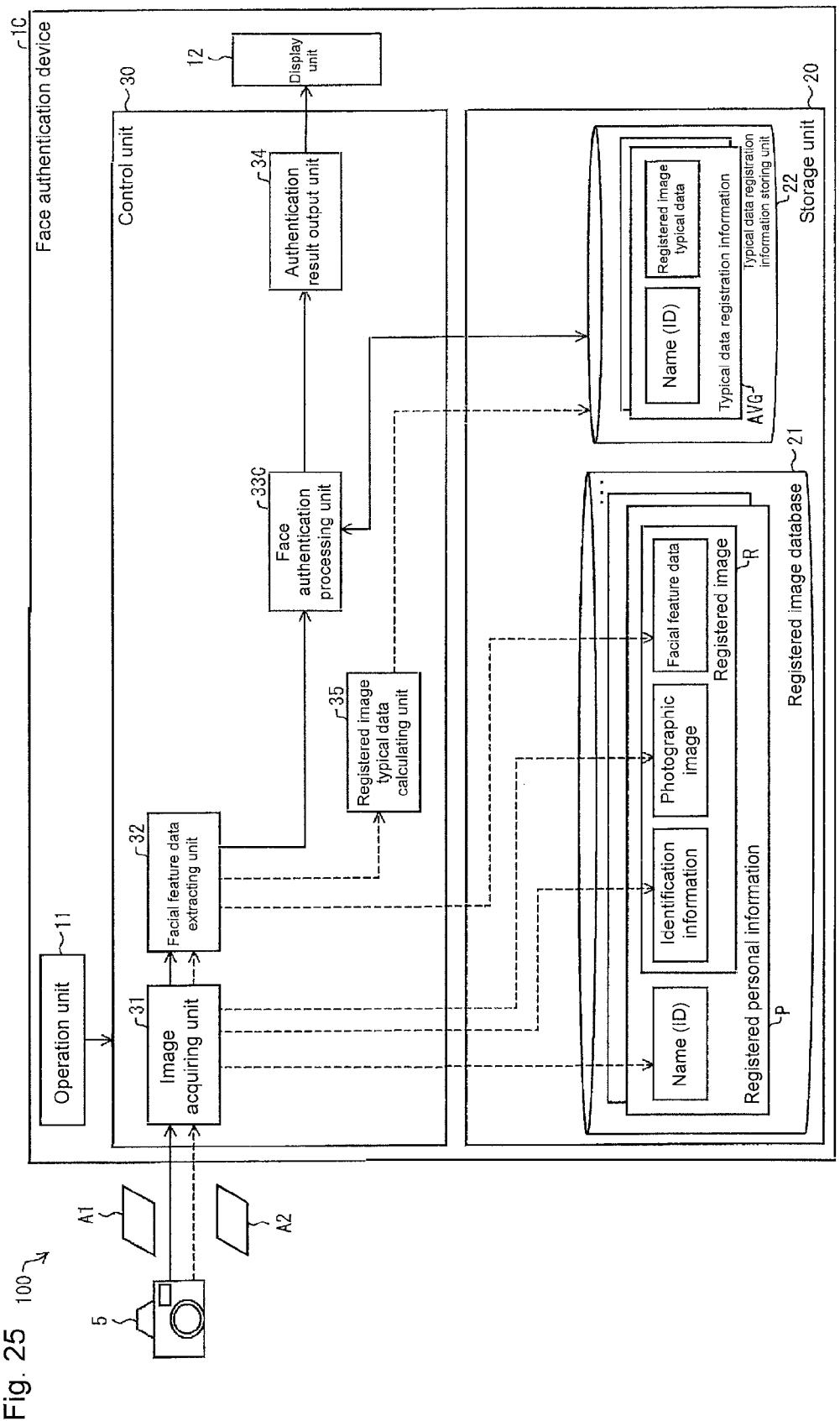
FIG. 25 is a block diagram illustrating a configuration of a face authentication system including a face authentication device according to still another embodiment of the present invention.

Another embodiment of the present invention will be described below with reference to FIG. 25 to FIG. 27. For the descriptive convenience, the same reference symbols denote the members having the same functions as described in the above embodiments, and a description thereof will be omitted.

In the face authentication device according to an embodiment of the present invention, a typical face image is calculated for each of the pieces of registered personal information P, and an absolute evaluation score and a relative evaluation score are calculated on the basis of the calculated typical face image.

A configuration of a face authentication device (image verification device) 1C will be described below with reference to FIG. 25. The face authentication device 1C illustrated in FIG. 25 is different from the face authentication device 1A described above in the following points.

More specifically, the face authentication device 1C is obtained such that, in the control unit 30 of the face authentication device 1A, the face authentication processing unit 33A is replaced with the face authentication processing unit 33C. A configuration of the face authentication processing unit 33C will be described below.

(Face Authentication Processing Unit)

A configuration of the face authentication processing unit 33C will be described with reference to FIG. 26. FIG. 26 is a functional block diagram showing an example of a schematic configuration of the face authentication processing unit 33C.

Figure 26:
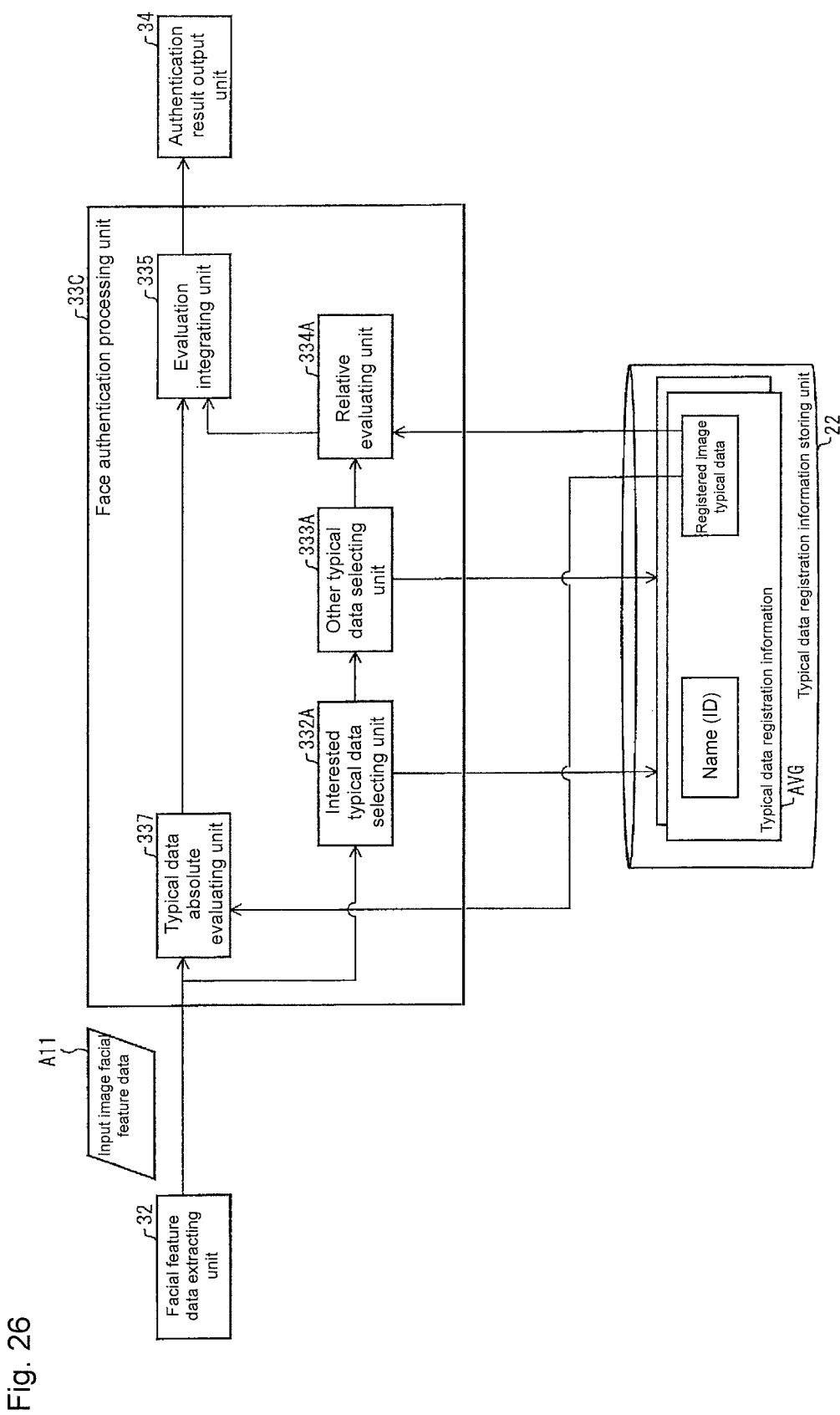
FIG. 26 is a functional block diagram illustrating an example of a schematic configuration of a face authentication processing unit included in the face authentication device.

As illustrated in FIG. 26, the face authentication processing unit 33C is obtained such that, in the face authentication processing unit 33A, the absolute evaluating unit 331 is replaced with the typical data absolute evaluating unit 337.

The typical data absolute evaluating unit 337 is the same as the typical data absolute evaluating unit 337 of the face authentication processing unit 33B in the above embodiments. Thus, the typical data absolute evaluating unit 337 has been described above, a description thereof will be omitted.

The face authentication processing unit 33C has a configuration using typical data registration information in both the absolute evaluation score and the relative evaluation score.

A configuration in which different registered image typical data are used for calculation of the absolute evaluation score and calculation of the relative evaluation score, respectively will be described below. However, the configuration is not necessarily used, and the same registered image typical data may be used for calculation of the absolute evaluation score and calculation of the relative evaluation score.

In the face authentication processing unit 33C, the registered image typical data calculating unit 35 is configured to independently register the pieces of typical data registration information for absolute evaluation score calculation and relative evaluation score calculation.

For example, the registered image typical data calculating unit 35 calculates an average value of the facial feature data of the registered image R and the facial feature data of the registration target image A2 as registered image typical data.

For example, the registered image typical data calculating unit 35 can calculate the facial feature data of the registered image R recently registered as registered image typical data.

An example in which the registered image data of the average value and the facial feature data of the registered image R recently registered are used for absolute evaluation score calculation and relative evaluation score calculation, respectively, will be described below. However, the configuration is not necessarily used, and an opposite configuration of the above configuration may be used.

(Flow of Face Image Registering Process)

A flow of a face image registering process in the face authentication device 1C is as described with reference to FIG. 18, and a description thereof will be omitted.

(Flow of Face Image Authentication Process)

Still another example of a flow of a face image authentication process that authenticates a photographic image obtained by photographing the face of a certain person as an input image will be described below with reference to FIG. 27. FIG. 27 is a flow chart illustrating the flow of the face image authentication process in the face authentication device 1C. The flow chart illustrated in FIG. 27 is obtained by replacing step S22 in the flow chart illustrated in FIG. 19 with step S22A.

Steps S20 and S21 are the same as described with reference to FIG. 12, and a description thereof will be omitted.

In step S22A, the typical data absolute evaluating unit 337 performs matching between an input image and pieces of typical data registration information for absolute evaluation score calculation to calculate absolute evaluation scores (S22A).

The interested typical data selecting unit 332A selects registered image typical data of one registered person as interested typical data from the registered image typical data registered for relative evaluation score calculation in the typical data registration information storing unit 22, the other typical data selecting unit 333A selects registered image typical data of a typical person different from the registered person of the interested typical data as selective typical data, and the relative evaluation unit 334A calculates a relative evaluation score between the interested typical data and the selective typical data (S23A).

Subsequent steps S24 to S26 are the same as described with reference to FIG. 12, and a description thereof will be omitted.

Example

A concrete example of the flow of the face image authentication process described with reference to FIG. 27 will be further described below with reference to FIG. 20 and FIG. 24.

In the example (will be described below), in a registered face image database, as illustrated in FIG. 20 and FIG. 24, the pieces of registered personal information P1 to P4 are registered. As illustrated in FIG. 20, it is assumed that, in the typical data registration information storing unit 22, the pieces of typical data registration information AVG10 to AVG40 for relative evaluation score calculation are registered. As illustrated in FIG. 24, it is assumed that, in the typical data registration information storing unit 22, pieces of typical data registration information AVG100 to AVG400 for absolute evaluation score calculation are registered.

Figure 27:
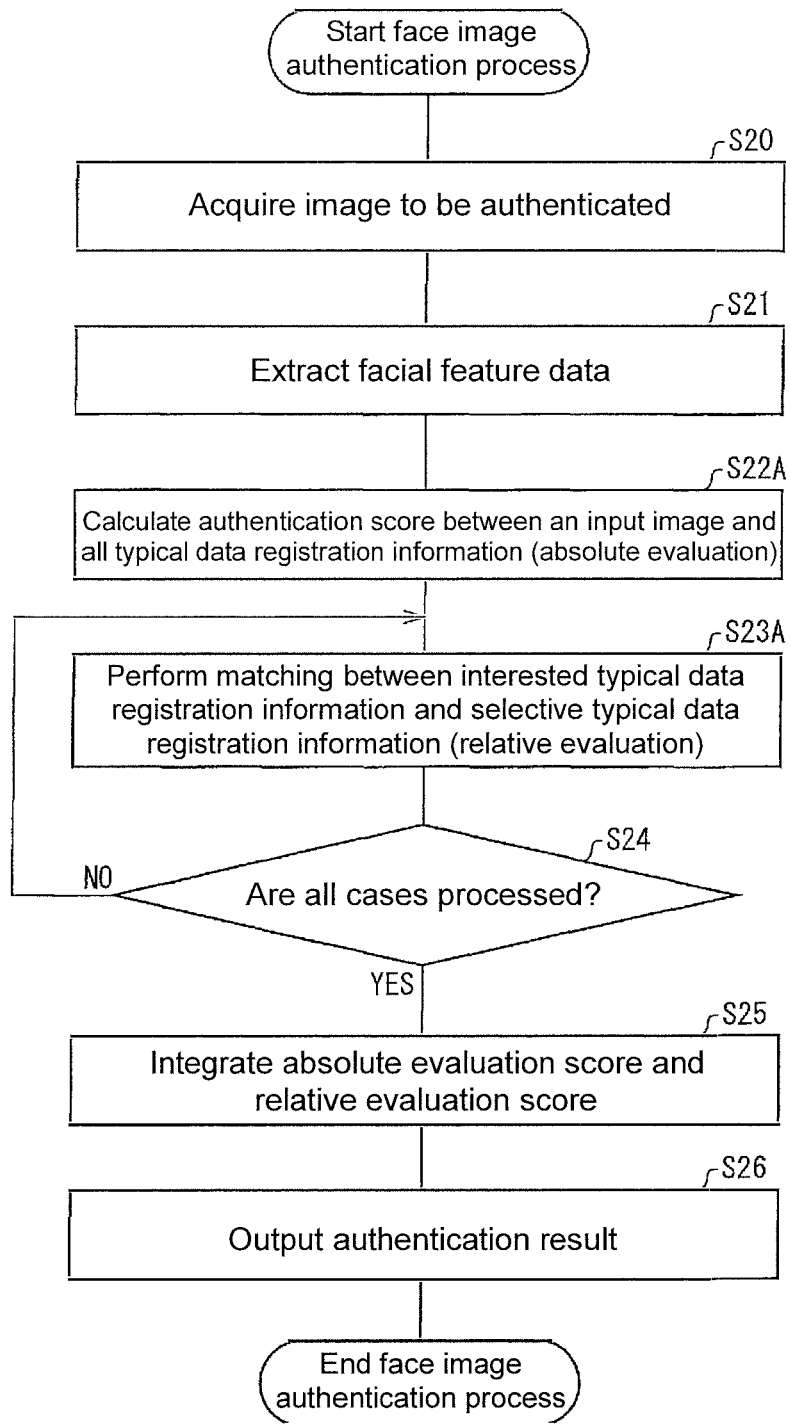
FIG. 27 is a flow chart illustrating a flow of a face image authentication process in the face authentication device.

A description will be performed along steps of the flow chart illustrated in FIG. 27. Steps S20 and S21 are the same as described with reference to FIG. 12 to FIG. 15.

In step S22A, the typical data absolute evaluating unit 337 performs matching between the input image A1 and the pieces of typical data registration information AVG100 to AVG400 to calculate absolute evaluation scores ABS100 to ABS400 for the typical data registration information AVG100 to AVG400, respectively.

In subsequent step S23A, the relative evaluation unit 334A calculates a relative evaluation score between interested typical data and selective typical data. In this case, a description of the relative evaluation score calculated by the relative evaluation unit 334A is as illustrated in FIG. 20.

As illustrated in FIG. 20, it is assumed that the interested typical data is registered image typical data of the typical data registration information AVG10 and that the selective typical data is registered image typical data of the pieces of typical data registration information AVG20 to AVG40.

At this time, as illustrated in FIG. 20, the relative evaluation unit 334A compares the registered image typical data of the typical data registration information AVG10 serving as the interested typical data with the registered image typical data of the pieces of typical data registration information AVG20, AVG30, and AVG40 serving as the selective typical data.

The relative evaluation unit 334A, on the basis of the comparison result, calculates relative evaluation scores REL201, REL301, and REL401.

A concrete method of calculating the relative evaluation scores REL200, REL300, and REL400 are the same as described with reference to FIG. 6, FIG. 7, and the like in the embodiments, and a description thereof will be omitted.

The relative evaluation unit 334A, in this manner, calculates the relative evaluation scores REL201, REL301, and REL401 about "Ms. or Mr. B", "Ms. or Mr. C", and "Ms. or Mr. D" (S24).

Concrete examples of steps S25 to S26 are the same as described with reference to FIG. 12 to FIG. 15, and a description thereof will be omitted.

(Function—Effect)

As described above, the face authentication device 1C is configured such that the typical data absolute evaluating unit 337 calculates an absolute evaluation score between the input image A1 and the typical data registration information AVG, and the relative evaluation unit 334A calculates a relative evaluation score by using the typical data registration information AVG.

According to the above configuration, a processing load in calculation of the absolute evaluation score and the relative evaluation score can be reduced.

As described above, the face authentication process executed without referring to the registered image database can be configured.

The pieces of typical data registration information are registered for the absolute evaluation score calculation and the relative evaluation score calculation, respectively, to make it possible to perform an authentication process using registered image typical data suitable for each of the score calculations. In this manner, authentication accuracy can be improved.

(Modification)

A modification of the face authentication device 1C will be described below.

The registered image typical data calculating unit 35 may be configured such that the registered image typical data is calculated by using a part of registered image that is registered. More specifically, the registered image typical data calculating unit 35 may use a partial space of the registered image that is registered to calculate the registered image typical data.

The registered image typical data calculating unit 35 may form registered image typical data by other methods (statistical method, multi-variate analysis, and the like).

The registered image typical data calculating unit 35 does not register pieces of typical data registration information for the absolute evaluation score calculation and the relative evaluation score calculation, respectively, and common typical data registration information may be used for the absolute evaluation score calculation and the relative evaluation score calculation.

CONCLUSION

The present invention is not limited to the above embodiments, and various changes and modifications of the invention can be effected within the scope of claims. An embodiment obtained by combining technical means disclosed in the different embodiments is included in the technical scope of the present invention.

For example, the above embodiments describe that the evaluation integrating unit 335 calculates a weighting average of the absolute evaluation scores and the relative evaluation scores in calculation of an integrated score. However, the evaluation integrating unit 335 may determine a weight w in equation (1) described above by the following manner.

More specifically, the weight w may be determined in advance, and the value of the weight w may be stored in a configuration file in the storage unit 20. The evaluation integrating unit 335 may read the value of the weight w from the storage unit 20 to calculate a weighting average.

The weight w may be determined on the basis of the number of registered images. More specifically, the weight w of the absolute evaluation score may be made high when the number of registered images is large. In contrast to this, the weight w of the relative evaluation score may be made low when the number of registered images is small.

The weight w may be determined on the basis of a difference between a state of registered data and a state of input data. In this case, the registered image R may be configured as a data structure including, as items, pieces of various information representing results obtained by analyzing a state of the face of a person, an environment, and a photographic condition when the photographic image is taken.

More specifically, the registered image R is configured as a data structure including items such as a "direction of face", an "expression of face", a "degree of smile", an "illumination condition", a "degree of glow", and the like. The registered image R may include, as other items, an "age", a "sex", a "eye-opening manner", and the like.

When a state indicated by the data items of all the registered image R and the state of the input image are different from each other, the weight w of the absolute evaluation score may be made high. In contrast to this, when a state indicated by the data items of all the registered image R and the state of the input image are similar to each other, the weight w of the relative evaluation score may be made low.

In the embodiments described above, although the face of a person is an object for registration and authentication, the object is not limited to the face of a person. An overall person may be used as an object, and a vehicle or a license plate thereof may be used as an object. An object for registration and authentication may be any thing that can be pattern-recognized. The object may be a part of another object. For example, when a certain object is a person, the face of the person that is a part of the object can be used as an object.

The blocks of the face authentication devices 1, 1A, 1B, and 1C may be configured by a hardware logic or may be produced by software using a CPU (will be described below).

More specifically, the device includes a CPU (central processing unit) that executes instructions of a control program that produces the functions, a ROM (read only memory) in which the program is stored, a RAM (random access memory) that develops the programs, a storage device (recording medium) such as a memory in which the program and various data are stored, and the like. According to one or more embodiments of the present invention, a recording medium on which program codes (executable format program, intermediate code program, and source program) of the control program of the above device serving as software realizing the above functions are computer-readably recorded is supplied to the device, and the computer (or CPU or MPU) reads and executes the program codes recorded on the recording medium.

As the recording medium, for example, a tape-based recording medium such as a magnetic tape or a cassette tape, a disk-based recording medium including a magnetic disk such as a floppy (registered trademark) disk/hard disk, an optical disk such as a CD-ROM/MO/MD/DVD/CD-R/Blue-ray disk (registered trademark), a card-based recording memory such as an IC card (including a memory card)/optical card, a semiconductor-memory-based recording medium such as a mask ROM/EPROM/EEPROM/flash ROM, and the like can be used.

The device may be configured to be able to be connected to a communication network, and the program codes may be supplied through the communication network. The communication network is not limited to a specific communication network. For example, the Internet, an intranet, an extranet, a LAN, an ISDN, a VAN, a CATV communication network, a virtual private network, a telephone network, a mobile communication network, a satellite communication network, and the like can be used. A transmission medium configuring a communication network is not limited to a specific transmission medium. For example, a wired transmission medium such as an IEEE1394, a USB, a power-line carrier, a cable TV network, a telephone line, or an ADSL and a wireless transmission medium such as infrared technology such as IrDA technology or remote control, Bluetooth (registered trademark), 802.11 wireless technology, HDR, a mobile telephone network, a satellite communication network, or a terrestrial digital broadcasting network can be used. One or more embodiments of the present invention can also be produced by the form of a computer data signal embedded in a carrier wave in which the program codes are embodied by electronic transmission.

[Appended Item]

As described above, the image verification device according to one or more embodiments of the present invention checks an input image obtained by photographing an object to be checked against a registered image database, wherein in the registered image database, an amount of feature of an image obtained by photographing an object is registered as a registered image, and the registered image includes registered images registered with respect to a plurality of objects, the image verification device includes: a verification score calculating means that calculates a verification score serving as a score representing a degree of approximation between the objects indicated by the registered images and the object of the input image by using the amount of feature of the input image and the amounts of feature of the registered images, a relative evaluation score calculating means that calculates a relative evaluation score serving as a score representing a degree of approximation between one object registered in the registered image database and the object of the input image in comparison with the other objects, an integrated score calculating means that calculates an integrated score obtained by weighting the verification score and the relative evaluation score, and an image verification means that performs verification of the input image on the basis of the integrated score.

As described above, the image verification program according to one or more embodiments of the present invention checks an input image obtained by photographing an object to be checked against a registered image database, wherein in the registered image database, an amount of feature of the image obtained by photographing the object is registered as a registered image, and the registered image includes registered images registered with respect to a plurality of objects, the image verification program causes a computer to execute a process including: a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating unit of calculating an integrated score obtained by weighting the verification score and the relative evaluation score, and an image verification step of performing verification of the input image on the basis of the integrated score.

As described above, the image verification method according to one or more embodiments of the present invention checks an input image obtained by photographing an object to be checked against a registered image database, wherein in the registered image database, an amount of feature of the image obtained by photographing the object is registered as a registered image, and the registered image includes registered images registered with respect to a plurality of objects, and the image verification method includes: a verification score calculating step of calculating a verification score serving as a score representing a degree of approximation between the objects indicated by the registered images and the object of the input image by using the amount of feature of the input image and the amounts of feature of the registered images, a relative evaluation score calculating step of calculating a relative evaluation score serving as a score representing a degree of approximation between one object registered in the registered image database and the object of the input image in comparison with the other objects, an integrated score calculating step of calculating an integrated score obtained by weighting the verification score and the relative evaluation score, and an image verification step of performing verification of the input image on the basis of the integrated score.

According to the above configuration, by using an integrated score obtained by considering not only a verification score between the input image and the object but also a relative evaluation score representing a degree of approximation between one object of the plurality of objects registered in the registered image database and the object of the input image in comparison with the other objects, verification of the input image can be performed.

In this case, the object means a pattern-recognizable thing typified by a person or an automobile. The object may be a part of a certain object. For example, the object is a person, and a part of the object is the face of the person.

An amount of feature of an image photographing an object means information to be compared to perform verification of an image obtained by photographing the object.

More specifically, the amount of feature may be an image itself obtained by photographing the object, i.e., a pixel value, or a value representing an apparent characteristic of the object that is extracted from the image.

The amount of feature may be extracted from one specific image obtained by photographing an object or may be extracted from a plurality of images obtained by photographing the object.

In the above configuration, the amounts of feature are registered in the registered image database as registered images in advance.

The verification score is a score derived by using the amount of feature of the input image and the amounts of feature of the registered images.

The verification score means a so-called degree of approximation representing a degree of approximation between the object photographed as the input image and the objects indicated by the registered images. Thus, in other words, the verification score is an absolute evaluation score that can be uniquely calculated between the input image and a registered image when the registered image is determined as a target of which the score should be calculated.

In this case, more specifically, the verification score is a degree of approximation obtained by comparing the amount of feature of the object photographed as the input image and amounts of feature of the registered images.

More specifically, the verification score can also represent a degree of approximation between the registered images and the input image with a central focus of the input image. For example, when the objects are persons, the verification scores tend to be close to each other between persons such as brothers having similar appearances.

In contrast to this, a relative evaluation score is a relative score derived from the registered image of a certain object and the registered images of the other objects. For example, the relative evaluation score is a relative score between the registered images of a plurality of objects derived by comparing verification scores between the registered image of a certain object and the input image with a verification score between the registered images of the other objects and the input image.

More specifically, a degree of similarity between the registered image of the certain object and the input image in comparison with the registered images of the other objects can be understood on the basis of the relative evaluation scores.

Furthermore, an integrated score obtained by integrating the verification score with the relative evaluation score is calculated. The integrated score, for example, can be calculated by a predetermined arithmetic method. The integrated score, more specifically, can be obtained by arbitrarily weighting the verification score and the relative evaluation score.

For example, the integrated score may be an average of the verification score and the relative evaluation score. In this case, both the scores may be uniformly weighted.

In addition, for example, the integrated score may be a weighting average of the verification score and the relative evaluation score.

As described above, the integrated score is obtained by combining the verification score serving as an index representing a degree of approximation between the input image and the registered image and a relative evaluation score serving as an index representing a degree of similarity between the registered image of one object in the registered images of a plurality of objects and the input image in comparison with the registered images of the other objects.

Since authentication is performed by using the integrated score as described above, an identification rate for similar objects that may be erroneously determined when verification is performed with only a verification score can be improved.

The image verification method may be achieved by a computer. In this case, when a computer is caused to execute a process including the steps described above, an image verification program that causes a computer to achieve the steps of the image verification method and a computer readable recording medium on which the image verification program is recorded are also included in the scope of the present invention.

The image verification device according to one or more embodiments of the present invention includes a typical image registering means that registers an amount of feature typifying a plurality of registered images registered about the same object for each of the plurality of objects as a typical image.

According to the above configuration, an amount of feature typifying a plurality of registered images registered about the same object for each of the plurality of objects is registered as a typical image.

The typical image may typify some registered images of all registered images registered about the same object. For example, the typical image may typify a registered image registered within a predetermined period of time.

The amount of feature of the typical image, for example, may be derived from amounts of feature of the plurality of registered images registered about the same object.

More specifically, the amount of feature of the typical image may be an average of the amounts of feature of a plurality of registered images registered about the same object.

In this manner, when a typical image based on the average of the amounts of feature of the plurality of registered images, even though the amounts of feature of the registered images include noise, the noise can be reduced by averaging the amounts of feature.

The amount of feature of the typical image may be an amount of feature of a specific registered image selected from a plurality of registered images registered about the same object. For example, the amount of feature of the latest registered image that is recently registered can be used as the amount of feature of the typical image.

In the image verification device according to one or more embodiments of the present invention, the relative evaluation score calculating means calculates the relative evaluation score by using a typical image that is a registered image having an amount of feature typifying a plurality of registered images registered about the object.

According to the above configuration, the relative evaluation score can be calculated by using a typical image of one object and a typical image of the other objects. In this case, the typical image is one registered image typifying an object of a plurality of registered images registered about a certain object.

According to the above configuration, since the relative evaluation score is calculated by using the typical image, a processing load in calculation of the absolute evaluation score can be reduced. More specifically, advantages can be obtained when the number of registered images is large.

In the image verification device according to one or more embodiments of the present invention, the verification score calculating means calculates a verification score between the input image and a typical image that is a registered image having an amount of feature typifying the plurality of registered images registered about the object.

According to the configuration, a verification score is calculated between the input image and the typical image. More specifically, according the configuration, a verification score is calculated by using the typical image for each of the objects. For this reason, a processing load in calculation of the verification score can be reduced. More specifically, advantages can be obtained when the number of registered images is large.

In the image verification device according to one or more embodiments of the present invention, the relative evaluation score calculating means calculates, in a projection space configured between the one object and the other object, a ratio of a degree of approximation between a projection point at which the input image is projected in the projection space or a degree of approximation between the projection point and the one object and a degree of approximation between the projection point and the other object as the relative evaluation score.

According to the configuration, by a method of using a characteristic space formed by the amount of feature of a registered image of an object, a relative evaluation score can be calculated.

More specifically, a projection point at which an input image is projected in a projection space is obtained. In this case, according to one or more embodiments of the present invention, as the projection space, a space in which identification of amounts of feature of registered images of both two different objects becomes better is selected. A one-dimensional projection space is a straight line, and a two-dimensional projection space is a plane. More specifically, the one-dimensional projection space is a projection straight line, and the two-dimensional projection space is a projection plane.

In the characteristic space, positional relationships between the projection point and the two objects are examined to calculate the degree of approximation. For example, the degree of approximation can be expressed as a distance such as a Euclidean distance or a Mahalanobis' distance between the projection point and the two objects.

The degree of approximation can be calculated by performing similarity calculation such as normalized correlation about the projection point and the two objects.

In the above configuration, the degree of approximation is calculated as a relative evaluation score. Alternatively, a ratio of a degree of approximation between one object and the projection point and a degree of approximation between the other object and the projection point can also be calculated as a relative evaluation score.

The above method is used to make it possible to obtain a relative evaluation score having a high verification accuracy.

In the image verification device according to one or more embodiments of the present invention, the relative evaluation score calculating means calculates a ratio of a degree of approximation between the object of the input image and the one object and a degree of approximation between the object of the input image and the other object as the relative evaluation score.

According to the above configuration, the ratio is calculated to make it possible to calculate a relative evaluation score with simple processing. The degree of approximation that has been calculated in advance can be used to contribute to a reduction in processing load.

In the image verification device according to one or more embodiments of the present invention, the relative evaluation score calculating means calculates, on an identification boundary configured between the one object and the other object, a distance between the object of the input image and the identification boundary as the relative evaluation score.

According to the configuration, by a method of forming an identification boundary in a characteristic space formed by the amount of feature of the registered image of the object, a relative evaluation score can be calculated.

As such a method, for example, cluster analysis of an amount of feature such as a K-means method, Boosting, and an SVM (support vector machine) is given.

According to the configuration, by the cluster analysis as described above, an identification boundary is configured between the object and the other object. According to the configuration, a distance between the object of the input image and the identification boundary is calculated as the relative evaluation score.

The above method is used to make it possible to obtain a relative evaluation score having a high verification accuracy.

In the image verification device according to one or more embodiments of the present invention, the integrated score calculating means calculates an average of the verification score and the relative evaluation score as the integrated score.

According to the configuration, since errors of the scores caused by deviation of data can be uniformed, preferable authentication accuracy may to be obtained.

In the image verification device according to one or more embodiments of the present invention, the object is the face of a person.

More specifically, in the above configuration, the input image is a face image obtained by photographing the face of a person, and face images obtained by photographing the faces of persons are registered in the registered image database.

According to the configuration, verification of the face of a person can be advantageously performed at a high accuracy.

According to one or more embodiments of the present invention, an image processing system including an image verification device and an image input device that supplies the input image to the image verification device can be configured.

As an example of the image processing system, a printer, a scanner, a personal computer or a device such as a digital camera for processing a digital image is given. A configuration in which the image verification device and the image input device are connected by a communication network can also be employed.

The concrete embodiments or examples executed in the section of the detailed description of the invention are only to clarify the technical contents of the present invention and should not be narrowly interpreted. Various changes and modifications of the invention can be effected within the spirit of the present invention and the scope of claims.

Since one or more embodiments of the present invention can be used for authentication of an object included in an image, one or more embodiments of the present invention can be used in a digital imaging device produced by a printer, a scanner, a personal computer, or the like, a digital camera, a security system, and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1, 1A, 1B, 1C face authentication device (image verification device)
5 image input device
A1 input image
A11 facial feature data of input image
21 registered image database
22 typical data registration information storing unit (registered image database)
33, 33A, 33B, 33C face authentication processing unit
34 authentication result output unit (image verification means)
100 face authentication system (image processing system)
331 absolute evaluating unit (verification score calculating means)
332 interested registered image selecting unit (relative evaluation score calculating means)
332A interested typical data selecting unit (relative evaluation score calculating means)
333 other registered image selecting unit (relative evaluation score calculating means)
333A other typical data selecting unit (relative evaluation score calculating unit)
334, 334A relative evaluation unit (relative evaluation score calculating means)
335 evaluation integrating unit (integrated score calculating means)
336 typical data authentication score calculating unit (relative evaluation score calculating means)
337 typical data absolute evaluating unit (verification score calculating means)
AVG typical data registration information (typical image)
P registered personal information
R registered image

The invention claimed is:

1. An image verification device that checks an input image obtained by photographing an object to be checked against a registered image database,
wherein, in the registered image database, an amount of feature of an image obtained by photographing an object is registered as a registered image, and the registered image includes registered images registered with respect to a plurality of objects,
wherein the image verification device comprises:
a verification score calculating unit that calculates a verification score serving as a score representing a degree of approximation between the objects indicated by the registered images and the object of the input image by using the amount of feature of the input image and the amounts of feature of the registered images;
a relative evaluation score calculating unit that calculates a relative evaluation score serving as a score representing a degree of approximation between one object registered in the registered image database and the object of the input image in comparison with the other objects;
an integrated score calculating unit that calculates an integrated score obtained by weighting the verification score and the relative evaluation score; and
an image verification unit that performs verification of the input image on the basis of the integrated score.

2. The image verification device according to claim 1, comprising a typical image registering unit that registers an amount of feature typifying a plurality of registered images registered about the same object for each of the plurality of objects as a typical image.

3. The image verification device according to claim 2, wherein the relative evaluation score calculating unit calculates the relative evaluation score by using the typical image.

4. The image verification device according to claim 3, wherein the relative evaluation score calculating unit calculates, in a projection space configured between the one object and the other object, a ratio of a degree of approximation between a projection point at which the input image is projected in the projection space or a degree of approximation between the projection point and the one object and a degree of approximation between the projection point and the other object as the relative evaluation score.

5. The image verification device according to claim 3, wherein the relative evaluation score calculating unit calculates a ratio of a degree of approximation between the object of the input image and the one object and a degree of approximation between the object of the input image and the other object as the relative evaluation score.

6. The image verification device according to claim 3, wherein the relative evaluation score calculating unit calculates, on an identification boundary configured between the one object and the other object, a distance between the object of the input image and the identification boundary as the relative evaluation score.

7. The image verification device according to claim 2, wherein the verification score calculating unit calculates the verification score by using the typical image.

8. The image verification device according to claim 7, wherein the relative evaluation score calculating unit calculates, in a projection space configured between the one object and the other object, a ratio of a degree of approximation between a projection point at which the input image is projected in the projection space or a degree of approximation between the projection point and the one object and a degree of approximation between the projection point and the other object as the relative evaluation score.

9. The image verification device according to claim 7, wherein the relative evaluation score calculating unit calculates a ratio of a degree of approximation between the object of the input image and the one object and a degree of approximation between the object of the input image and the other object as the relative evaluation score.

10. The image verification device according to claim 2, wherein the relative evaluation score calculating unit calculates, in a projection space configured between the one object and the other object, a ratio of a degree of approximation between a projection point at which the input image is projected in the projection space or a degree of approximation between the projection point and the one object and a degree of approximation between the projection point and the other object as the relative evaluation score.

11. The image verification device according to claim 2, wherein the relative evaluation score calculating unit calculates a ratio of a degree of approximation between the object of the input image and the one object and a degree of approximation between the object of the input image and the other object as the relative evaluation score.

12. The image verification device according to claim 2, wherein the relative evaluation score calculating unit calculates, on an identification boundary configured between the one object and the other object, a distance between the object of the input image and the identification boundary as the relative evaluation score.

13. The image verification device according to claim 1, wherein the relative evaluation score calculating unit calculates, in a projection space configured between the one object and the other object, a ratio of a degree of approximation between a projection point at which the input image is projected in the projection space or a degree of approximation between the projection point and the one object and a degree of approximation between the projection point and the other object as the relative evaluation score.

14. The image verification device according to claim 1, wherein the relative evaluation score calculating unit calculates a ratio of a degree of approximation between the object of the input image and the one object and a degree of approximation between the object of the input image and the other object as the relative evaluation score.

15. The image verification device according to claim 1, wherein the relative evaluation score calculating unit calculates, on an identification boundary configured between the one object and the other object, a distance between the object of the input image and the identification boundary as the relative evaluation score.

16. The image verification device according to claim 1, wherein the integrated score is an average value of the verification score and the relative evaluation score.

17. The image verification device according to claim 1, wherein the object is a face of a person.

18. An image processing system comprising:
the image verification device according to claim 1; and
an image input device that supplies the input image to the image verification device.

19. An image verification program stored on a non-transitory computer readable medium that checks an input image obtained by photographing an object to be checked against a registered image database,
wherein, in the registered image database, an amount of feature of an image obtained by photographing an object is registered as a registered image, and the registered image includes registered images registered with respect to a plurality of objects,
wherein the image verification program causes a computer to execute a process comprising:
a verification score calculating step of calculating a verification score serving as a score representing a degree of approximation between the objects indicated by the registered images and the object of the input image by using the amount of feature of the input image and the amounts of feature of the registered images;
a relative evaluation score calculating step of calculating a relative evaluation score serving as a score representing a degree of approximation between one object registered in the registered image database and the object of the input image in comparison with the other objects;
an integrated score calculating unit of calculating an integrated score obtained by weighting the verification score and the relative evaluation score;
and an image verification step of performing verification of the input image on the basis of the integrated score.

20. An image verification method that checks an input image obtained by photographing an object to be checked against a registered image database,
wherein, in the registered image database, an amount of feature of an image obtained by photographing an object is registered as a registered image, and the registered image includes registered images registered with respect to a plurality of objects,
wherein the image verification method comprises:
a verification score calculating step of calculating a verification score serving as a score representing a degree of approximation between the objects indicated by the registered images and the object of the input image by using the amount of feature of the input image and the amounts of feature of the registered images;
a relative evaluation score calculating step of calculating a relative evaluation score serving as a score representing a degree of approximation between one object registered in the registered image database and the object of the input image in comparison with the other objects;
an integrated score calculating step of calculating an integrated score obtained by weighting the verification score and the relative evaluation score; and
an image verification step of performing verification of the input image on the basis of the integrated score.

* * * * *